(12) United States Patent
Pulley et al.

(10) Patent No.: US 12,140,669 B2
(45) Date of Patent: *Nov. 12, 2024

(54) RATIO METRIC POSITION SENSOR AND CONTROL SYSTEM

(71) Applicant: Woodward, Inc., Fort Collins, CO (US)

(72) Inventors: Gregory Warren Pulley, Loveland, CO (US); Brian Lynn Swope, Janesville, WI (US); Jordan Loren Loos, Rockford, IL (US); James D. Rosplock, Roscoe, IL (US); Brian Hoemke, Belvidere, IL (US); Brett A. Flannery, Poplar Grove, IL (US); Andrew Ryan Whitson, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,596

(22) Filed: Mar. 25, 2022

(65) Prior Publication Data

US 2022/0214452 A1 Jul. 7, 2022

Related U.S. Application Data

(63) Continuation-in-part of application No. 16/987,828, filed on Aug. 7, 2020, now Pat. No. 11,668,818.

(51) Int. Cl.
*G01S 15/88* (2006.01)
*G01S 7/539* (2006.01)
*G01S 15/06* (2006.01)

(52) U.S. Cl.
CPC ............... *G01S 15/88* (2013.01); *G01S 7/539* (2013.01); *G01S 15/06* (2013.01)

(58) Field of Classification Search
CPC combination set(s) only.
See application file for complete search history.

(56) References Cited

U.S. PATENT DOCUMENTS 3,218,852 A 11/1965 Scarpa et al.
3,575,050 A 4/1971 Lynnworth
(Continued)

FOREIGN PATENT DOCUMENTS

CN 205642485 10/2016
DE 3116333 11/1982
(Continued)

OTHER PUBLICATIONS

European Search Report in European Application No. EP 23151677.4, dated Apr. 3, 2023, 7 pages.
(Continued)

*Primary Examiner* — Daniel L Murphy
*Assistant Examiner* — Amie M Ndure
(74) *Attorney, Agent, or Firm* — Fish & Richardson P.C.

(57) ABSTRACT

The subject matter of this specification can be embodied in, among other things, a position sensor system that includes a sensor housing defining a first cavity having a first face, a fluid effector including an actuator housing having an inner surface defining a second cavity, and a moveable body having a second face and configured for reciprocal movement within the second cavity, an acoustic transmitter system configured to emit a first emitted acoustic waveform toward the first face, and emit a second emitted acoustic waveform toward the second face, and an acoustic receiver system configured to detect a first reflected acoustic waveform based on a first reflection of the first emitted acoustic waveform based on the first face, and detect a second reflected acoustic waveform based on a second reflection of the second emitted acoustic waveform based on the second face.

25 Claims, 21 Drawing Sheets

(56) References Cited

U.S. PATENT DOCUMENTS

| | | | |
|---|---|---|---|
| 3,925,692 | A | 12/1975 | Leschek et al. |
| 4,157,482 | A * | 6/1979 | Kakinuma ............... H03K 3/45 |
| | | | 310/155 |
| 4,297,608 | A | 10/1981 | Jensen |
| 4,308,745 | A | 1/1982 | Lisitsa et al. |
| 4,320,659 | A | 3/1982 | Lawrence et al. |
| 4,345,657 | A | 8/1982 | Mig |
| 4,754,645 | A | 7/1988 | Piche et al. |
| 5,464,039 | A | 11/1995 | Bergamini |
| 5,750,892 | A | 5/1998 | Huang |
| 6,005,395 | A | 12/1999 | Chan et al. |
| 6,651,484 | B2 | 11/2003 | Fiebelkorn et al. |
| 7,051,765 | B1 | 5/2006 | Kelley et al. |
| 7,464,611 | B2 | 12/2008 | Matter |
| 7,600,417 | B2 | 10/2009 | Paradise |
| 7,954,387 | B1 | 6/2011 | Furlong et al. |
| 8,181,536 | B2 | 5/2012 | Augenstein et al. |
| 8,584,531 | B2 | 11/2013 | Liao et al. |
| 8,756,990 | B2 | 6/2014 | Speldrich |
| 8,950,436 | B2 | 2/2015 | Chalupa et al. |
| 8,959,913 | B2 | 2/2015 | Nagurney et al. |
| 9,057,391 | B2 | 6/2015 | Sawchuk et al. |
| 9,182,259 | B2 | 11/2015 | Suzuki |
| 9,187,974 | B2 | 11/2015 | Coonrod et al. |
| 9,239,337 | B2 | 1/2016 | Mueller |
| 9,261,389 | B2 | 2/2016 | Gill |
| 9,267,833 | B2 | 2/2016 | Ohmiya |
| 9,297,680 | B2 | 3/2016 | Maruyama et al. |
| 9,605,695 | B2 | 3/2017 | Sawchuk et al. |
| 9,702,855 | B2 | 7/2017 | Han et al. |
| 9,759,591 | B2 | 9/2017 | Pearson et al. |
| 9,891,085 | B2 | 2/2018 | Muhammad et al. |
| 10,126,762 | B2 | 11/2018 | Loos et al. |
| 10,208,555 | B2 | 2/2019 | Gottlieb et al. |
| 10,309,432 | B2 | 6/2019 | Reckner et al. |
| 11,307,069 | B2 | 4/2022 | Loos |
| 11,650,087 | B2 | 5/2023 | Davey et al. |
| 11,668,818 | B2 | 6/2023 | Loos et al. |
| 11,885,655 | B2 | 1/2024 | Loos et al. |
| 2002/0195246 | A1* | 12/2002 | Davidson ................... B01J 8/02 |
| | | | 166/177.6 |
| 2004/0093957 | A1 | 5/2004 | Buess |
| 2004/0123672 | A1 | 7/2004 | Wang |
| 2005/0016281 | A1 | 1/2005 | Hill et al. |
| 2005/0189108 | A1* | 9/2005 | Davidson ............... E21B 43/003 |
| | | | 166/177.6 |
| 2007/0125826 | A1* | 6/2007 | Shelton ............ A61B 17/07207 |
| | | | 227/176.1 |
| 2007/0227263 | A1 | 10/2007 | Fukano |
| 2007/0233412 | A1 | 10/2007 | Gotoh |
| 2008/0294144 | A1* | 11/2008 | Leo ....................... A61B 5/6885 |
| | | | 604/535 |
| 2010/0050455 | A1* | 3/2010 | Siraky ................... G01D 5/2457 |
| | | | 33/708 |
| 2011/0022335 | A1 | 1/2011 | Foucault et al. |
| 2011/0042938 | A1 | 2/2011 | Gallagher et al. |
| 2012/0073687 | A1 | 3/2012 | Hanson et al. |
| 2012/0188842 | A1 | 6/2012 | Smith |
| 2012/0247223 | A1 | 10/2012 | Sawchuk et al. |
| 2012/0312522 | A1 | 12/2012 | Quin et al. |
| 2013/0205892 | A1 | 8/2013 | Ueda |
| 2014/0086017 | A1 | 3/2014 | Nakano et al. |
| 2014/0138567 | A1 | 5/2014 | Coull |
| 2014/0198822 | A1 | 7/2014 | Lei et al. |
| 2014/0260513 | A1 | 9/2014 | Smirnov et al. |
| 2014/0260667 | A1 | 9/2014 | Berkcan |
| 2014/0311253 | A1 | 10/2014 | Iwasa |
| 2015/0013472 | A1 | 1/2015 | Gill et al. |
| 2015/0082913 | A1 | 3/2015 | Maruyama et al. |
| 2015/0160053 | A1 | 6/2015 | Baumoel |
| 2016/0061629 | A1 | 3/2016 | Han et al. |
| 2016/0258798 | A1 | 9/2016 | Muhammad et al. |
| 2017/0102364 | A1 | 4/2017 | Hill et al. |
| 2017/0350741 | A1* | 12/2017 | Marshall ................... G01F 1/74 |
| 2018/0051973 | A1* | 2/2018 | Schrubbe ............... G01D 5/145 |
| 2018/0058202 | A1* | 3/2018 | Disko .................... E21B 47/12 |
| 2018/0058209 | A1* | 3/2018 | Song ......................... G01F 1/74 |
| 2018/0306625 | A1 | 10/2018 | Baker |
| 2019/0154026 | A1* | 5/2019 | Kamen .................. G16H 40/67 |
| 2019/0250022 | A1 | 8/2019 | Gagne et al. |
| 2020/0041375 | A1 | 2/2020 | Bowdle |
| 2020/0173569 | A1 | 6/2020 | Koch et al. |
| 2021/0164816 | A1 | 6/2021 | Loos |
| 2021/0278262 | A1 | 9/2021 | Loos |
| 2022/0034695 | A1 | 2/2022 | Loos |
| 2022/0042835 | A1 | 2/2022 | Loos |
| 2022/0042836 | A1 | 2/2022 | Loos |
| 2022/0043142 | A1 | 2/2022 | Loos |
| 2022/0299349 | A1 | 9/2022 | Loos et al. |
| 2022/0323995 | A1 | 10/2022 | Gyde et al. |
| 2023/0066926 | A1 | 3/2023 | Loos et al. |
| 2024/0085229 | A1 | 3/2024 | Loos et al. |

FOREIGN PATENT DOCUMENTS

| | | | |
|---|---|---|---|
| DE | 19710296 | | 3/1998 |
| DE | 29916826 | | 11/2000 |
| DE | 102013224819 | | 6/2015 |
| DE | 102014205042 | | 9/2015 |
| DE | 102014205042 | A1 * | 9/2015 ........... F15B 15/2884 |
| DE | 102016105338 | | 9/2017 |
| DE | 202017007116 | | 8/2019 |
| EP | 0451355 | | 10/1991 |
| EP | 0907069 | | 4/1999 |
| EP | 1188935 | | 3/2002 |
| EP | 1279368 | | 1/2003 |
| EP | 2232342 | | 9/2010 |
| EP | 2824429 | | 1/2015 |
| EP | 2827111 | | 1/2015 |
| EP | 3222980 | | 9/2017 |
| GB | 2259571 | | 3/1993 |
| GB | 2321705 | | 8/1998 |
| GB | 2336681 | | 10/1999 |
| JP | 2006337059 | | 12/2006 |
| JP | 2010261872 | | 11/2010 |
| WO | WO9205042 | | 4/1992 |
| WO | WO 2004010087 | | 1/2004 |
| WO | WO2005040732 | | 5/2005 |
| WO | WO2009071746 | | 6/2009 |
| WO | WO2016033534 | | 3/2016 |
| WO | WO2020157707 | | 8/2020 |
| WO | WO2021040540 | | 3/2021 |
| WO | WO2021113444 | | 6/2021 |

OTHER PUBLICATIONS

PCT International Search Report and Written Opinion in International Appln. No. PCT/US2022/075579, mailed on Dec. 23, 2022, 15 pages.

Flowconditioner.com [online], "Flow Conditioners," Canada Pipeline Accessories, Jun. 2021, retrieved on Dec. 14, 2022, retrieved from URL <https://www.flowconditioner.com/flow-conditioner/>, 6 pages.

NASA.gov [online], "Balanced Flow Meters without Moving Parts," NASA Technical Reports Server, Jan. 2008, retrieved on Dec. 14, 2022, retrieved from URL <https://ntrs.nasa.gov/citations/20090020619>, 2 pages.

NASA.gov [online], "NASA Tech Briefs, Jan. 2008," NASA Technical Reports Server, Jan. 2008, retrieved on Dec. 14, 2022, retrieved from URL <https://ntrs.nasa.gov/archive/nasa/casi.ntrs.nasa.gov/20090020593.pdf>, 43 pages.

No Author Listed, "ASME PTC 19.5—2004—Flow Measurement—Performance Test Codes," The American Society of Mechanical Engineers, Jul. 2005, 184 pages.

PIProcessinstrumentation.com [online], "Improving flow measurement accuracy with flow conditioners," Jan. 12, 2017, retrieved on Dec. 14, 2022, retrieved from URL <https://www.piprocessinstrumentation.com/home/article/15563560/improving-flow-measurement-accuracy-with-flow-conditioners>, 11 pages.

(56) References Cited

OTHER PUBLICATIONS

Sanderson et al., "Guidelines for the Use of Ultrasonic Non-Invasive Metering Techniques," Flow Measurement and Instrumentation, 2002, 13(4):125-142.
Stoof et al., "Contributing to Economic Upstream Gas Metering with a Dual-Path Ultrasonic Flow Metering Solution," SICK AG, Oct. 2018, 20 pages.
Wateronline.com [online], "QCT Series In-Line Ultrasonic Flow Meters for Low Viscosity Liquid Applications," Jun. 2021, retrieved on Dec. 14, 2022, retrieved from URL <https://www.wateronline.com/doc/qct-series-in-line-ultrasonic-flow-meters-for-low-viscosity-liquid-applications-0001>, 1 page.
International Preliminary Report on Patentability in International Application No. PCT/US2021/045040, mailed on Feb. 16, 2023, 9 pages.
International Preliminary Report on Patentability in International Application No. PCT/US2021/045042, mailed on Feb. 16, 2023, 10 pages.
International Preliminary Report on Patentability in International Application No. PCT/US2021/045049, mailed on Feb. 16, 2023, 10 pages.
Hoche et al., "Ultrasound-Based Density Determination via Buffer Rod Techniques", J. Sens. Syst., 2013, 2:103-125.
Kazys et al., "Ultrasonic Technique for Density Measurement of Liquids in Extreme Conditions", Sensors, 2015, 15:19393-19415.
Nakamura, "Ultrasonic Transducers: Materials and Design for Sensors, Actuators and Medical Applications", Woodhead Publishing, 2012.
PCT International Preliminary Report on Patentability in International Appln. No. PCT/US2020/063013, dated Feb. 21, 2022, 12 pages.
PCT International Search Report and Written Opinion in International Appln. No. PCT/US2020/063013, dated May 11, 2021, 21 pages.
PCT International Search Report and Written Opinion in International Appln. No. PCT/US2021/021103, dated Jun. 16, 2021, 14 pages.
PCT International Search Report and Written Opinion in International Appln. No. PCT/US2021/045040, dated Nov. 16, 2021, 15 pages.
PCT International Search Report and Written Opinion in International Appln. No. PCT/US2021/045042, dated Nov. 19, 2021, 6 pages.
PCT International Search Report and Written Opinion in International Appln. No. PCT/US2021/045047, dated Mar. 1, 2022, 21 pages.
PCT International Search Report and Written Opinion in International Appln. No. PCT/US2021/045049, dated Nov. 16, 2021, 6 pages.
PCT Invitation to Pay Additional Fees, and, Where Applicable, Protest Fee in International Appln. No. PCT/US2020/063013, dated Mar. 19, 2021, 16 pages.
PCT Invitation to Pay Additional Fees, and, Where Applicable, Protest Fee in International Appln. No. PCT/US2021/045047, dated Nov. 19, 2021, 14 pages.
Puttmer et al., "Ultrasonic Density Sensor for Liquids", IEEE Transactions on Ultrasonics, Ferroelectrics, and Frequency Control, Jan. 2000, 47(1):85-92.
International Search Report and Written Opinion in International Appln. No. PCT/US2023/016039, mailed on Jul. 3, 2023, 15 pages.
PCT International Preliminary Report on Patentability in International Appln. No. PCT/US2021/045047, dated Sep. 28, 2023, 13 pages.
Communication Pursuant to Article 94(3) EPC in European Patent Application No. 21714749.5, dated Sep. 21, 2023, 7 pages.
Communication Pursuant to Article 94(3) EPC in European Patent Application No. 23151677.4, dated Mar. 19, 2024, 5 pages.
International Preliminary Report on Patentability in International Application No. PCT/US2022/075579, mailed on Mar. 7, 2024, 8 pages.
Communication Pursuant to Article 94(3) EPC in European Patent Application No. 21714749.5, dated Apr. 26, 2024, 6 pages.

\* cited by examiner

RATIO METRIC POSITION SENSOR AND CONTROL SYSTEM

CROSS-REFERENCE TO RELATED PATENT APPLICATIONS

This application is a continuation-in-part of and claims the benefit of priority to U.S. patent application Ser. No. 16/987,828, filed Aug. 7, 2020, the contents of which are incorporated by reference herein.

TECHNICAL FIELD

This instant specification relates to ultrasonic position sensors.

BACKGROUND

Position measurement devices are used for the characterization and operation of fluid control systems. Traditionally, effector (e.g., valve body, piston head) position tracking is achieved through the use of linear variable differential transformers (LVDTs). LVDTs drive system sizing and introduce accuracy and sizing constraints. Specifically, actuation devices generally require the LVDT be installed through the piston rod, driving actuator sizing.

Ultrasonic position sensors are a proven industrial technology that can be leveraged for position detection. Existing time of flight ultrasonic position sensors emit acoustic pings and measure the amount of time until reflected echoes of the pings return. The amount of time between the transmission and return of the pings is generally dependent upon the distance between the transceiver and the object being measured, and the speed of sound in the medium through which the pings are being transmitted. That speed of sound is dependent upon the characteristics of the medium, such as its density, temperature, and/or acoustic impedance. Existing time of flight ultrasonic position sensors depend upon on predetermined knowledge or determination of the speed of sound through the medium through which the pings are being transmitted in order to function. In applications such as fuel valves and pressure regulators, the temperatures and types of fuels used can vary, which can cause the speed of sound to vary dynamically during operation. The speed of sound of a medium can be sensed, but the inclusion of these additional sensors adds to the complexity, size, cost, and weight of such systems.

SUMMARY

In general, this document describes ultrasonic position sensors.

In an example embodiment, a position sensor system includes a sensor housing defining a first cavity having a first face, a fluid effector including an actuator housing having an inner surface defining a second cavity, and a moveable body having a second face and configured for reciprocal movement within the second cavity, an acoustic transmitter system configured to emit a first emitted acoustic waveform toward the first face, and emit a second emitted acoustic waveform toward the second face, and an acoustic receiver system configured to detect a first reflected acoustic waveform based on a first reflection of the first emitted acoustic waveform based on the first face, and detect a second reflected acoustic waveform based on a second reflection of the second emitted acoustic waveform based on the second face.

Various embodiments can include some, all, or none of the following features. The position sensor system can include a timer configured to determine a first time of flight of the first emitted acoustic waveform and the first reflected acoustic waveform, and determine a second time of flight of the second emitted acoustic waveform and the second reflected acoustic waveform. The position sensor system can include a processor system configured to determine a position of the moveable body within the second cavity based on the first time of flight and the second time of flight. The acoustic transmitter system can be configured to emit one or both of the first emitted acoustic waveform and the second emitted acoustic waveform through a fluid in one or both of the first cavity and the second cavity, and the acoustic receiver system can be configured to receive one or both of the first reflected acoustic waveform and the second reflected acoustic waveform from the fluid in one or both of the first cavity and the second cavity. The acoustic transmitter system can be configured to transmit the second emitted acoustic waveform at a predetermined emitted frequency, and the acoustic receiver system can be configured to determine a reflected frequency of the second reflected acoustic waveform. The position sensor system can include a processor system configured to determine a speed of the moveable body based on the predetermined emitted frequency and the reflected frequency. The fluid effector can be a linear piston effector, the first cavity can be a first tubular cavity having a first longitudinal end and a second longitudinal end defining the first face opposite the first longitudinal end, the second cavity can be a second tubular cavity having a third longitudinal end and a fourth longitudinal end opposite the third longitudinal end, the moveable body can be a piston head configured for longitudinal movement within the second tubular cavity, the acoustic transmitter system can include a first acoustic transmitter arranged at the first longitudinal end and a second acoustic transmitter arranged at the third longitudinal end, and the acoustic receiver system can include a first acoustic receiver arranged at the first longitudinal end and a second acoustic receiver arranged at the third longitudinal end. The position sensor system can include a unified cavity having the first cavity and the second cavity. The first face can be at least partly defined by a shoulder extending between first cavity and the second cavity. The acoustic transmitter system can include a first acoustic emitter configured to emit the first emitted acoustic waveform toward the first face, and a second acoustic emitter configured to emit the second emitted acoustic waveform toward the second face. The second acoustic emitter at least partly concentrically surrounds the first acoustic emitter. The position sensor system can include a phase detector configured to determine a difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform. The position sensor system can include another moveable body having a third face and configured for reciprocal movement within a third cavity, wherein the acoustic transmitter system is configured to emit a third emitted acoustic waveform toward the third face, and the acoustic receiver system is configured to detect a third reflected acoustic waveform based on a third reflection of the third emitted acoustic waveform based on the third face.

In an example implementation, a method of position sensing includes emitting a first emitted acoustic waveform through a fluid having a first acoustic impedance toward a first acoustic interface, emitting a second emitted acoustic waveform through the fluid toward a second acoustic interface, reflecting, by the first acoustic interface, a first reflected acoustic waveform based on the first emitted acoustic waveform, reflecting, by the second acoustic interface, a second reflected acoustic waveform based on the second emitted acoustic waveform, and determining a first position of the second acoustic interface based on the first reflected acoustic waveform and the second reflected acoustic waveform.

Various implementations can include some, all, or none of the following features. The method can include determining a first time of flight based on the first emitted acoustic waveform and the first reflected acoustic waveform, and determining a second time of flight based on the second emitted acoustic waveform and the second reflected acoustic waveform, wherein determining a first position of the second acoustic interface is further based on the first time of flight and the second time of flight. Determining the first position of the second acoustic interface based on the first time of flight ($t1$) and the second time of flight ($t2$) can be given by an equation: $(t1-t2)/(t1+t2)$. The method can include determining a second position of the second acoustic interface, and determining a speed of the second acoustic interface based on the first position and the second position. The method can include determining a reflected acoustic frequency based on one or both of the first reflected acoustic waveform and the second reflected acoustic waveform, and determining a speed of the second acoustic interface based on the determined reflected acoustic frequency and a predetermined emitted acoustic frequency of the second emitted acoustic waveform. The first acoustic interface can be defined by a first face of a fluid cavity having a second acoustic impedance that is different than the first acoustic impedance, the second acoustic interface can be defined by a second face of a moveable body within a fluid effector and having a third acoustic impedance that is different than the first acoustic impedance, the first emitted acoustic waveform can be emitted toward the first face through the fluid, the second emitted acoustic waveform can be emitted toward the second face through the fluid, the first reflected acoustic waveform can be based on a first reflection of the first emitted acoustic waveform by the first face, and the second reflected acoustic waveform can be based on a second reflection of the second emitted acoustic waveform by the second face. The method can include determining a phase difference between a second emitted phase of the second emitted acoustic waveform and a second reflected phase of the second reflected acoustic waveform, wherein determining a first position of the second acoustic interface can be further based on the determined phase difference. The first emitted acoustic waveform can be emitted through a first fluid cavity toward a face of the first fluid cavity defining the first acoustic interface, and the second emitted acoustic waveform can be emitted through a second fluid cavity toward a second face of a moveable member defining the second acoustic interface. The first emitted acoustic waveform can be emitted through a first portion of a fluid cavity toward a face of the fluid cavity defining the first acoustic interface, and the second emitted acoustic waveform can be emitted through a second portion of the fluid cavity toward a second face of a moveable member defining the second acoustic interface. The method can include emitting a third emitted acoustic waveform through the fluid toward a third acoustic interface, reflecting, by the third acoustic interface, a third reflected acoustic waveform based on the third emitted acoustic waveform, and determining a second position of the third acoustic interface based on the first reflected acoustic waveform and the third reflected acoustic waveform.

In another example embodiment, a non-transitory computer storage medium is encoded with a computer program, the computer program having instructions that when executed by data processing apparatus cause the data processing apparatus to perform operations including emitting a first emitted acoustic waveform through a fluid having a first acoustic impedance toward a first acoustic interface, emitting a second emitted acoustic waveform through the fluid toward a second acoustic interface, reflecting, by the first acoustic interface, a first reflected acoustic waveform based on the first emitted acoustic waveform, reflecting, by the second acoustic interface, a second reflected acoustic waveform based on the second emitted acoustic waveform, and determining a first position of the second acoustic interface based on the first reflected acoustic waveform and the second reflected acoustic waveform.

The systems and techniques described here may provide one or more of the following advantages. First, a system can determine a position and/or speed of a target object though an acoustic transmission medium. Second, the system can operate without determining the acoustic properties of the transmission medium. Third, the system can have a more efficient and/or economical mechanical design compared to existing mechanical position measurement solutions such as variable differential transformers (VDTs). Fourth, the system can have a more efficient and/or economical electronic design compared to existing ultrasonic position measurement solutions. Fifth, the system can provide a more space efficient option for system sizing. Sixth, the system can improve weight, pump demand, thermal loads, and measurement accuracy.

The details of one or more implementations are set forth in the accompanying drawings and the description below. Other features and advantages will be apparent from the description and drawings, and from the claims.

DETAILED DESCRIPTION

This document describes systems and techniques for ultrasonic position sensing, more particularly, for sensing the position of moveable members in fluid environments, such as valve bodies and piston heads. In general, the ultrasonic position sensing systems and techniques described in this document measure the distance from a moveable object to each end of its length of travel to determine a ratiometric position value that can be determined without needing to know or otherwise determine the speed of sound in the medium in which the ultrasonic signals are being transmitted.

Figure 1:
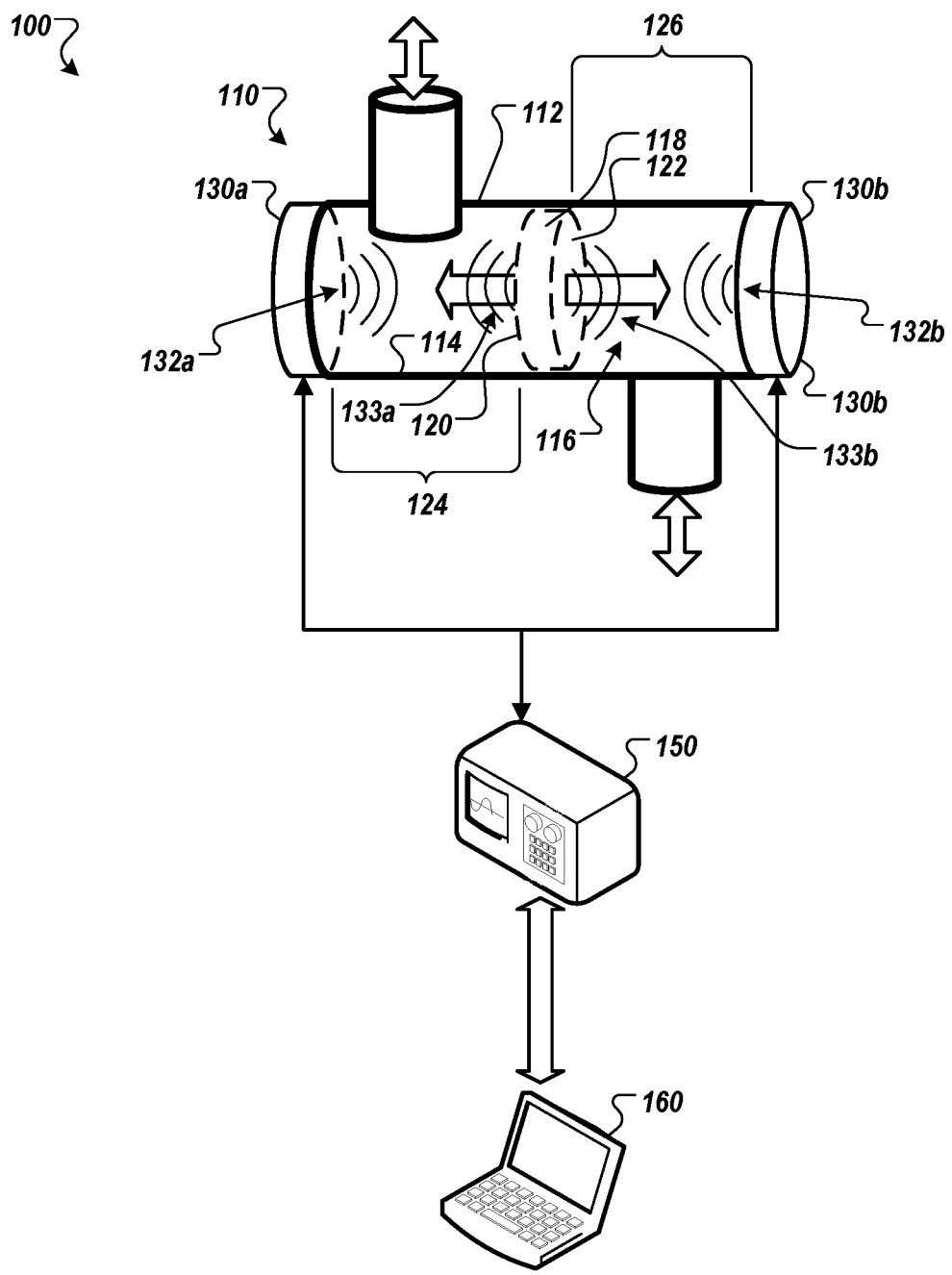
FIG. 1 is a schematic diagram that shows an example of a system for ultrasonic position measurement.

FIG. 1 is a schematic diagram that shows an example of a system 100 for ultrasonic position measurement (e.g., a position sensor system). The system 100 includes a fluid effector 110. The fluid effector 110 includes a housing 112 having an inner surface 114 defining a cavity 116 (e.g., a cylindrical cavity), and a moveable body 118. The moveable body 118 has a face 120 and a face 122 opposite the face 120, and is configured for reciprocal movement within the housing 112. The moveable body 118 is configured to contact the inner surface 114 and subdivide the cavity 116 to define a fluid chamber 124 at the face 120 and define a fluid chamber 126 at the face 122, and is configured for longitudinal movement within the cavity 116.

The fluid effector 110 includes an acoustic transceiver 130a. The acoustic transceiver 130a includes an acoustic transmitter system configured to emit an emitted acoustic waveform 132a in a first direction toward the face 120. The acoustic transceiver 130a also includes an acoustic receiver system configured to detect a reflected acoustic waveform 133a based on a first reflection of the emitted acoustic waveform 132a based on the moveable body 118. In some embodiments, a single transducer (e.g., a piezo element) can perform the functions of both the acoustic transmitter and the acoustic receiver. In some embodiments, the acoustic transmitter and the acoustic receiver can be discrete components.

The fluid effector 110 also includes an acoustic transceiver 130b. The acoustic transceiver 130b includes an acoustic transmitter system configured to emit an emitted acoustic waveform 132b in a second direction opposite the first direction toward the face 122. The acoustic transceiver 130a also includes an acoustic receiver system configured to detect a reflected acoustic waveform 133b based on a second reflection of the emitted acoustic waveform 132b based on the moveable body 118. In some embodiments, a single transducer (e.g., a piezo element) can perform the functions of both the acoustic transmitter and the acoustic receiver. In some embodiments, the acoustic transmitter and the acoustic receiver can be discrete components.

A signal processor 150 is configured to process signals from the acoustic transceiver 130a and the acoustic transceiver 130b to determine the position of the moveable body 118 within the cavity 116. A controller 160 (e.g., a computer) is configured to receive position information from the signal processor 150 and perform functions based on the position information (e.g., control a process, present information to a user, transmit information to another system, record a log). In some embodiments, the signal processor 150 can include a timer (e.g., to measure the times of flight of emitted and reflected signals). In some embodiments, the signal processor 150 can include a phase detector (e.g., to determine phase and/or Doppler shifts in reflected signals).

In general, the fluid effector 110 is configured as a ratiometric position-sensing device. A transmit-receive transducer is located on either end of the effector. Both transmitters can send a pulse echo and receive an echo upon reflection from the effector piston. Time measurements of the two transducers can independently determine the position of a moveable body when sound speed is known. However, when coupling two transducers into a system, sound speed is cancelled and a ratiometric ultrasound position sensor is obtained. In some implementations, if either transducer fails, redundancy can be obtained through measurement or approximation of sound speed. The techniques for processing the signals, and several embodiments of the fluid effector 110, will be discussed in the descriptions of FIGS. 2-8.

Figure 2:
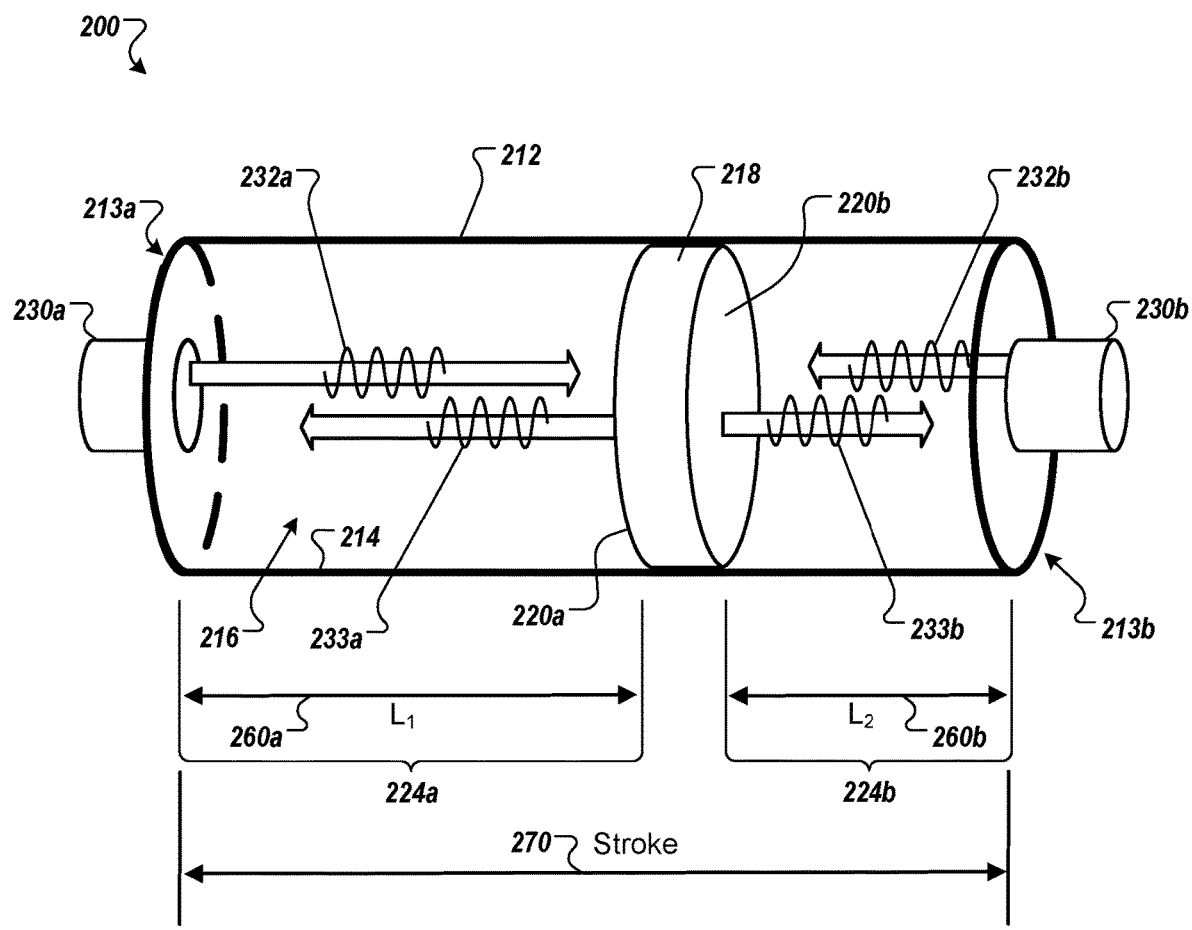
FIG. 2 is an internal view of an example of a linear fluid effector.

FIG. 2 is an internal view of an example of a linear fluid effector 200. In some implementations, the linear fluid effector 200 can be the example fluid effector 110 of FIG. 1.

The fluid effector 200 includes a housing 212 having an inner surface 214 defining a cavity 216 (e.g., a tubular cavity), and a moveable body 218. The housing 212 is generally tubular, having a first longitudinal end 213a and a second longitudinal end 213b opposite the first longitudinal end 213a, and a length represented by arrow 270.

The moveable body 218 has a face 220a and a face 220b opposite the face 220a. The moveable body 218 is configured for reciprocal movement within the housing 212. The moveable body 218 is configured to contact the inner surface 214 and subdivide the cavity 216 to define a fluid chamber 224a on the side of the face 220a and define a fluid chamber 224b on the side of the face 220b.

In some embodiments, the fluid effector 200 can be configured as a valve. For example, the housing 212 can be a valve housing and the moveable body 218 can be a valve body configured to slide longitudinally within the valve housing to control fluid flow. In some embodiments, the fluid effector 200 can be configured as a pressure regulator or sensor, in which fluid pressure in one or both of the fluid chambers 224a-224b can urge movement of the moveable body 218 within the housing. In some embodiments, the fluid effector 200 can be configured as a fluid actuator. For example, the housing 212 can be a hydraulic cylinder and the moveable body 218 can be a piston head that can be moved within the cavity 216 to urge a fluid flow, or a piston head that can be moved within the cavity 216 by fluid pressure within the fluid chambers 224a-224b. In some embodiments, the fluid effector 200 can be configured as any appropriate form of device in which a moveable body moves linearly within a fluid-filled cavity.

The fluid effector 200 includes an acoustic transceiver 230a. The acoustic transceiver 230a includes an acoustic transmitter system configured to emit an emitted acoustic waveform 232a toward the face 220a through a medium (e.g., a fluid) filling the fluid chamber 224a. The acoustic transceiver 230a also includes an acoustic receiver system configured to detect a reflected acoustic waveform 233a based on a reflection of the emitted acoustic waveform 232a off the moveable body 218.

The fluid effector 200 includes an acoustic transceiver 230b. The acoustic transceiver 230b includes an acoustic transmitter system configured to emit an emitted acoustic waveform 232b toward the first face 220b through a medium filling the fluid chamber 224b. The acoustic transceiver 230b also includes an acoustic receiver system configured to detect a reflected acoustic waveform 233b based on a reflection of the emitted acoustic waveform 232b off the moveable body 218. In some embodiments, a single transducer (e.g., a piezo element) can perform the functions of both the acoustic transmitter and the acoustic receiver. In some embodiments, the acoustic transmitter and the acoustic receiver can be discrete components.

The acoustic transceivers 230a-230b are configured to be activated by an external system such as the example signal processor 150 of FIG. 1, and provide signals based on the reflected acoustic waveforms 233a-233b to the external system for processing. In some embodiments, a single transducer (e.g., a piezo element) can perform the functions of both the acoustic transmitter and the acoustic receiver. In some embodiments, the acoustic transmitters and the acoustic receivers can be discrete components.

The medium through which the acoustic waveforms 232a and 233a travel has a speed of sound ($C_1$). In the illustrated example, the measured time ($t_1$) (e.g., a first time-of-flight) in conjunction with the sound speed ($C_1$) defines a distance $L_1$ (represented by arrow 260a) from the acoustic transceiver 230a to the face 220a of the moveable body 218:

$$2L_1 = t_1 * C_1 \quad \text{(Equation 1)}$$

The medium through which the acoustic waveforms 232b and 233b travel has a speed of sound ($C_2$). In the illustrated example, the measured time ($t_2$) (e.g., a second time-of-flight) in conjunction with the sound speed ($C_2$) defines a distance $L_2$ (represented by arrow 260b) from the acoustic transceiver 230b to the face 220b of the moveable body 218:

$$2L_2 = t_2 * C_2 \quad \text{(Equation 2)}$$

The acoustic transceivers 230a and 230b and the moveable body 218 can be configured such that the signals are used to determine a ratiometric value for the position of the moveable body 218 within its range of motion (e.g., the distance $L_1+L_2$, or the length 270 minus the longitudinal thickness of the moveable body 218):

$$\text{Position} \sim \frac{t_1 - t_2}{t_1 + t_2} \sim \frac{\frac{2L_1}{C_1} - \frac{2L_2}{C_2}}{\frac{2L_1}{C_1} + \frac{2L_2}{C_2}} \quad \text{(Equation 3)}$$

In use, the speed of sound in the fluid that fills the cavity 216 does not need to be known or determined. Since both sides of the cavity 216 are filled with the same type of fluid under substantially the same conditions (e.g., temperature), the speed of sound in the fluid will be the same on both sides of the cavity 216, and the speed of sound becomes cancelled out of Equation 3. And since the speed of sound drops out of Equation 3, the relative position of the moveable body 218 within the cavity 216 becomes a unitless ratiometric value. An absolute position of the moveable body 218 can be determined, if needed, based on the ratiometric value and a predetermined value for the range of motion (e.g., $L_1+L_2$). For example, if the range of motion is known to be 10 cm, and the position is determined to be 0.63 (e.g., based on $t_1$ and $t_2$), then the absolute position of the moveable body 218 within the cavity 216 can be determined.

For example, the transducers may sit flush with the bore of the cylinder on both ends (e.g., if the piston head sits on the wall time is zero on the face). In this example, if the piston is precisely in the middle, then $t_1=t_2$, which is 50% of stroke. However, Equation 3 is Position~$(t_1-t_2)/(t_1+t_2)$→$(t_1=t_2)$ (e.g., the numerator goes to zero). As the piston strokes in one direction, $t_1$ decreases and $t_2$ increases, driving the ratio negative. Conversely, as the piston strokes in the opposite direction, the ratio increases. So at one stop the position output is −1 in this example, and at the opposite stop the position output is +1. In another example, for an Equation 3 measurement of 0.63 this would fall between −1 (e.g., retract) and +1 (e.g., extend). The percentage of total stroke here becomes $(0.63-(-1))/(1-(-1))$→$1.63/2$→$81.5\%$ of total stroke. For a piston configuration having a total stroke of 10 cm, the actual position from the housing stop would be $(L_1+L_2)*81.5\%=10$ cm$*81.5\%=8.15$ cm, and the distance from the opposing stop would be 10 cm−8.15 cm=−1.85 cm.

Since the ratiometric value is based on the distances between the acoustic transceivers 230a and 230b and the faces 220a and 220b, the thickness of the moveable body 218 (e.g., the distance between the faces 220a and 220b) does not directly affect the ratiometric value. In some implementations, the absolute positions of the faces 220a and 220b can be determined based on a determined absolute position of the moveable body 218 and the predetermined thickness of the moveable body 218 (e.g., the absolute position of the face 220a-220b can be offset from the absolute position of the center of the moveable body 218 by plus or minus one-half the distance between the faces 220a and 220b or another predetermined offset distance).

The described technique can be extended to perform additional functions. For example, by pinging the two sides of the moveable body 218, the position of the moveable body 218 can be determined. By pinging the two sides of the moveable body 218 again to determine a second position of the moveable body, the difference in the two positions and the amount of time between the two measurements can be used to determine a speed of the moveable body 218. The determined speed of the moveable body 218 and predetermined knowledge of the mechanical configuration of the fluid effector 200 can be used to determine a linear velocity of the moveable body 218 (e.g., the speed can be determined, and the moveable body 218 is known to move linearly). In another example, multiple positions and/or velocities can be measured and/or determined, and such information can be used to determine an acceleration of the moveable body 218.

In the example fluid effector 200, the acoustic waveforms 232a and 232b are reflected off the faces 220a and 220b. The reason that the acoustic waveforms 232a and 232b are reflected is because the moveable body 218 defines an acoustic interface at the faces 220a and 220b. The fluid in the fluid chambers 224a and 224b has an acoustic impedance, and the moveable body 218 has a different acoustic impedance. As in many types of signal transmission systems, an impedance mismatch can cause a transmitted signal to be reflected. In the illustrated example in which ultrasonic signals are being transmitted, the locations of these impedance mismatches define the locations of acoustic interfaces. In the illustrated example, the face 220a and the face 220b define the locations of the acoustic impedance mismatches and their corresponding acoustic interfaces. Other examples of using acoustic interfaces for determining the location of a moveable body are discussed in further detail in the descriptions of FIGS. 3-5.

Figure 3:
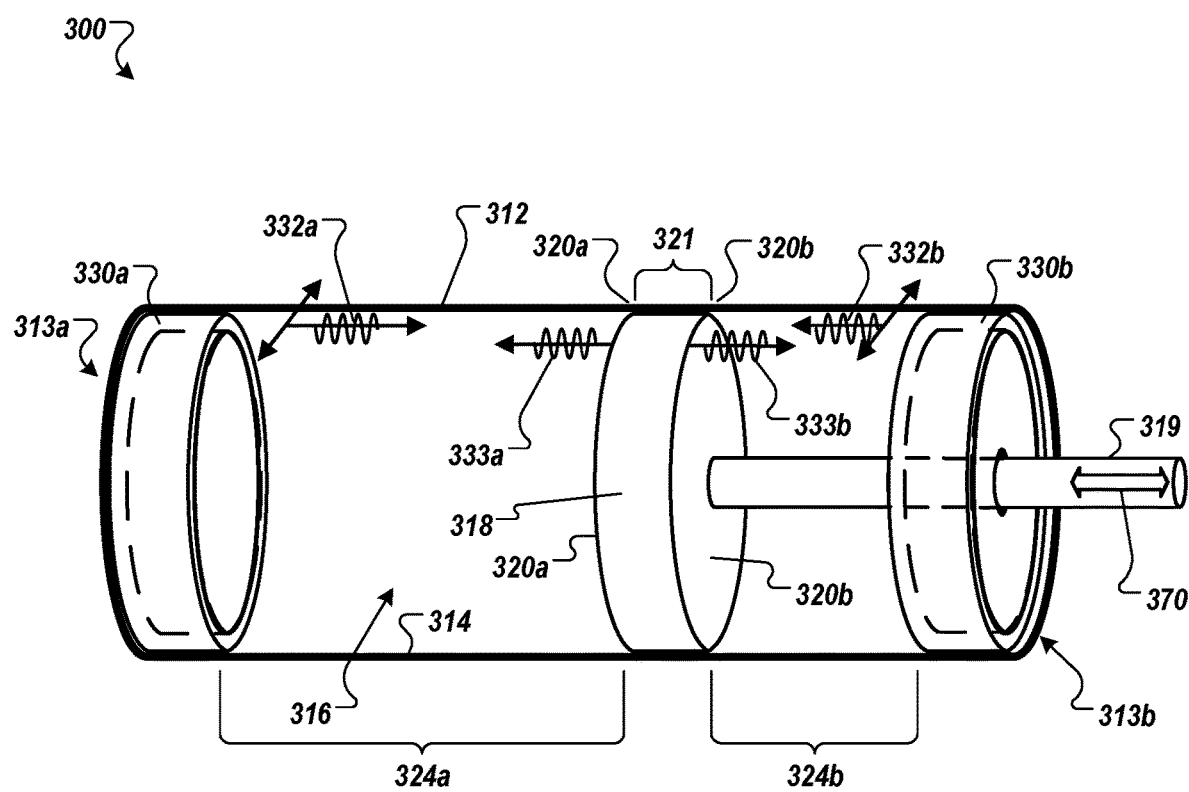
FIG. 3 is an internal view of another example of a linear fluid effector.

FIG. 3 is an internal view of another example of a linear fluid effector 300 (e.g., a linear piston effector). In some implementations, the linear fluid effector 300 can be the example fluid effector 110 of FIG. 1. In general, this embodiment also relies on time of flight, but uses transverse waves propagating within the cylinder wall of the actuator instead of the hydraulic working fluid.

The linear fluid effector 300 includes a housing 312 having an inner surface 314 defining a cavity 316. A moveable body 318 (e.g., a piston head in the illustrated example) is configured to move longitudinally within the cavity 316 to actuate a piston rod 319. The housing 312 is generally tubular, having a first longitudinal end 313a and a second longitudinal end 313b opposite the first longitudinal end 313a.

The moveable body 318 has a face 320a and a face 320b opposite the face 320a. The moveable body 318 is configured for reciprocal movement within the housing 312 with a total stroke (represented by arrow 370). The moveable body 318 is configured to contact the inner surface 314 and subdivide the cavity 316 to define a fluid chamber 324a on the side of the face 320a and define a fluid chamber 324b on the side of the face 320b.

The linear fluid effector 300 includes an acoustic transceiver 330a. The acoustic transceiver 330a includes an acoustic transmitter system configured to emit an emitted acoustic waveform 332a through the housing 312 toward a first side 320a of an acoustic interface 321. The acoustic transceiver 330a also includes an acoustic receiver system configured to detect a reflected acoustic waveform 333a based on a reflection of the emitted acoustic waveform 332a off the acoustic interface 321.

The linear fluid effector 300 includes an acoustic transceiver 330b. The acoustic transceiver 330b includes an acoustic transmitter system configured to emit an emitted acoustic waveform 332b through the housing 312 toward a second side 320b of the acoustic interface 321. The acoustic transceiver 330b also includes an acoustic receiver system configured to detect a reflected acoustic waveform 333b based on a reflection of the emitted acoustic waveform 332b off the acoustic interface 321.

The acoustic transceivers 330a-330b are configured to be activated by an external system such as the example signal processor 150 of FIG. 1, and provide signals based on the reflected acoustic waveforms 333a-333b to the external system for processing. In some embodiments, a single transducer (e.g., a piezo element) can perform the functions of both the acoustic transmitter and the acoustic receiver. In some embodiments, the acoustic transmitter and the acoustic receiver can be discrete components.

Transverse waves and/or surface acoustic waves are generated by acoustic transceivers 330a-330b located on opposing ends of the cylinder wall in intimate acoustic contact with the housing 312. In some embodiments, the acoustic transceivers 330a-330b can be formed of bonded bulk ceramic, bulk single-crystal, or deposited piezoelectric layers, material films, or any other appropriate material that can form an integral part of the housing 312. The acoustic transceivers 330a-330b are configured to generate a hoop stress in the housing 312 which propagates in the axial direction along the housing 312. Transverse waves and surface acoustic waves cannot propagate within fluidic masses, substantially eliminating the effects of reverberation and cross coupling within the fluid that may otherwise interfere with measurement accuracy. The waves are reflected when they reach the moveable body 318, being in intimate contact with the housing 312, produces an abrupt acoustic impedance change in the propagation path.

In some implementations, this embodiment can be used in applications that cannot accommodate transducers in contact with the hydraulic fluid medium, cannot accommodate the required pressure ports into the hydraulic cylinder, would otherwise benefit from reduced size and location of the transducers, or require higher measurement accuracy than previous position indicators. In some implementations, sensor accuracy may not be substantially impacted compared to the echoes in the fluid. The acoustic transceivers 330a-330b may further be located within the inner diameter of the housing 312 in contact with the fluid, or externally on the outside of housing 312. In some embodiments, the acoustic transceivers 330a-330b can be fashioned as removable transducers. For example, the use of removable transducers can enable the techniques described in this document to be applied or retrofitted to hydraulic or pneumatic fluidic actuators not originally designed or conceived to possess position sensing functionality at the time of manufacture.

The process of determining the position of the moveable member 318 is similar to that of the process described in relation to the example fluid effector 200 of FIG. 2, except that instead of transmitting and receiving the acoustic waveforms 232a, 232b, 233a, and 233b though fluid in the fluid chambers 224a and 224b as in the example fluid effector 200, the acoustic waveforms 332a, 332b, 333a, and 333b are transmitted through the housing 312. The emitted acoustic waveforms 332a and 332b are reflected by the acoustic interface 321 as the reflected acoustic waveforms 333a and 333b.

In use, the times of flight of the emitted acoustic waveforms 332a and 332b, and their return as the reflected acoustic waveforms 333a and 333b can be measured (e.g., times-of-flight) and used to determine the ratiometric position (and by extension, the absolute position) of the moveable member 318 and the piston rod 319. For example, equations 1-3 discussed above can also be used with the times-of-flight determined from the linear fluid effector 300.

Figure 4:
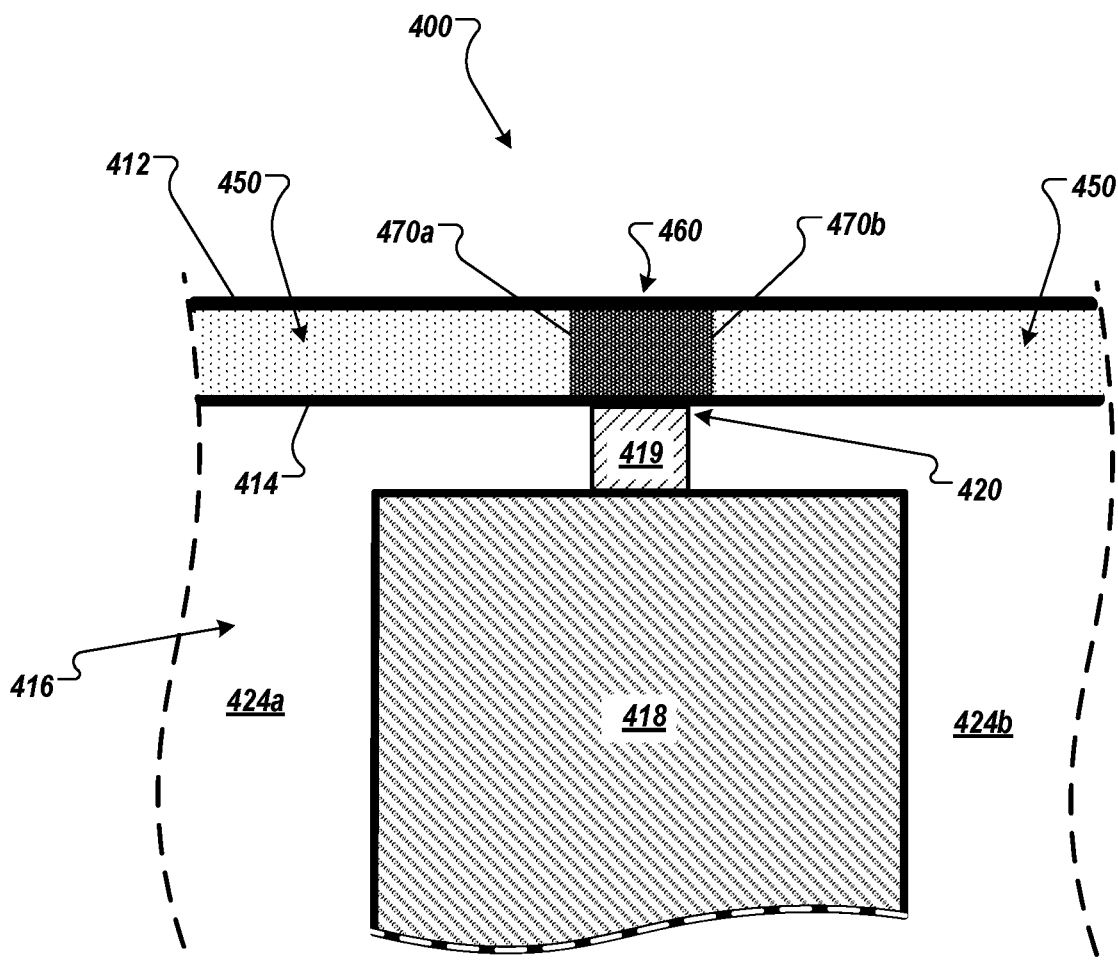
FIG. 4 is a sectional view of an example of an acoustic interface.

FIG. 4 is a sectional view of an example of an acoustic interface 400. In some examples, the acoustic interface 400 can be the example acoustic interface 321 of FIG. 3. In the illustrated example, a housing 412 includes an inner surface 414 that defines a cavity 416. A seal 419 is configured to contact the inner surface 414 and a moveable body 418 to subdivide the cavity 416 into a fluid chamber 424a and a fluid chamber 424b. The seal 419 contacts the housing 412 at a contact area 420.

Acoustic impedance is defined as $Z=\rho_B V_P$, where $\rho_B$ is the bulk density of the medium and is the longitudinal velocity of the wave in the medium. The housing 412 is made out a material that has a natural acoustic impedance, for example, due to the temperature, density, and other properties of the material from which the housing 412 is formed. In the illustrated example, the regions of the housing 412 having the natural acoustic impedance are represented by a light dither pattern and the identifier 450. For example, the acoustic impedance of aluminum is about 17.10 $g/cm^2$-sec$\times 10^5$, and the acoustic impedance of 347 stainless steel is about 45.40 $g/cm^2$-sec$\times 10^5$. These are just two examples of acoustic impedances for two different materials. The techniques described in this document make it unnecessary to know, determine, or estimate the acoustic impedance of a material.

The housing 412 also includes a region of modified acoustic impedance represented by a denser dither pattern and the identifier 460. In some embodiments, the effective acoustic impedance of a material can be affected by mechanical contact with or proximity to another object at or around the point of contact or proximity. For example, mechanical contact between the seal 419 and the housing 412 can acoustically dampen the housing 412 at or around the contact area 420 and increase the acoustic density of the housing 412 at or near the contact area 420. In such examples, the region 460 can have a relatively higher acoustic impedance than the regions 450. In another example, the seal 419 may have a lower acoustic impedance than the housing 412, and mechanical contact between the seal 419 and the housing 412 can provide a path of lesser acoustic impedance for acoustic vibrations travelling along the housing 412 at or near the contact area 420, effectively lowering the acoustic impedance of the acoustic transmission pathway in the region 460 relative to the regions 450.

In general, when two sections of a transmission medium have different impedances, an impedance mismatch is presented. The boundaries between differing acoustic impedances define the locations of acoustic impedance mismatches, which are also called acoustic interfaces. In the illustrated example, acoustic waves traverse at the interface of the fluid and the housing (e.g., along the inner surface 414). The mismatch in impedance occurs when the fluid becomes the seal. The junctions where the inner surface 414, the fluid, and the seal 419 coincide one another define an acoustic interface 470a and an acoustic interface 470b.

As in many types if signal transmission processes, a signal that propagates along a transmission pathway and then encounters an impedance mismatch can result in at least a portion of the signal to be reflected back along the transmission pathway. Similarly, acoustic signals (e.g., the emitted acoustic waveforms 332a and 332b) can be reflected back toward their sources by acoustic interfaces.

In the illustrated example, the locations of the acoustic interfaces 470a and 470b within the housing 412 are defined by the location of the moveable body 418 within the cavity 416 (e.g., the moveable body 418 defines the location of the seal 419, which defines the location of the region 460, which defines the locations of the acoustic interfaces 470a and 470b). Movement of the moveable body 418 causes the acoustic interfaces 470a and 470b to move as well.

Returning briefly to FIG. 3, movement of the moveable body 318 causes corresponding movements of acoustic interfaces (e.g., the acoustic interfaces 470a and 470b) within the housing 312. As the moveable body 318 moves, the distances between the acoustic transceivers 330a and 330b and their respective acoustic interfaces change as well, which causes proportional changes in the times-of-flight of the emitted acoustic waveforms 332a and 332b and the reflected acoustic waveforms 333a and 333b. As discussed above, the times of flight can be used to determine the ratiometric position of the acoustic interfaces along the housing 312, and therefore determine the position of the moveable member 318 within the cavity 316. As also discussed above, these locations can be determined without knowing or determining the acoustic properties of the housing (e.g., the acoustic impedances of the housing or of regions of modified acoustic impedance, which can change dynamically with temperature).

Figure 5:
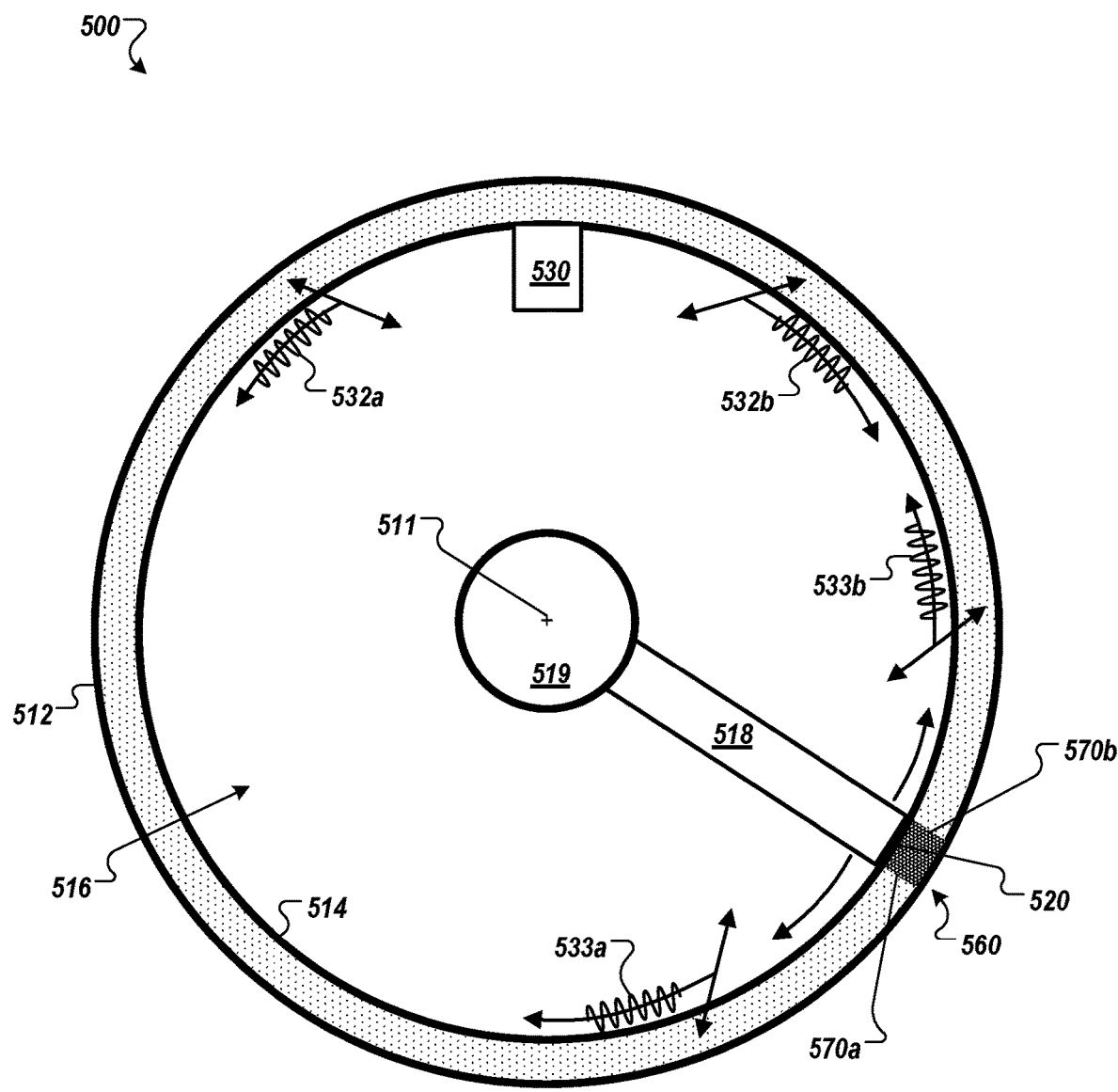
FIG. 5 is a sectional view of an example of a rotary fluid effector.

FIG. 5 is a sectional view of an example of a rotary fluid effector 500. In some implementations, the rotary fluid effector 500 can be the example fluid effector 110 of FIG. 1. The rotary fluid effector 500 includes a housing 512 having an inner surface 514 defining a cavity 516 that is generally cylindrical. A moveable body 518 (e.g., a rotary vane in the illustrated example) is configured to move semi-elliptically (e.g., rotate, pivot) about a central axis 511 of a shaft 519 within the cavity 516. In some embodiments, the moveable body 518 can be configured to urge rotation of the shaft 519.

The moveable body 518 is configured to contact the inner surface 514 (e.g., directly or through a seal) along a contact area 520 at or along an axial position of the generally cylindrical housing 512. The materials used to form the housing 512 have an acoustic impedance, and the contact between the moveable body 518 and the housing 512 modified the acoustic impedance of the housing 512 at or around the contact area 520 to define a region 560 having a modified acoustic impedance. The region 560 presents an acoustic impedance mismatch within the housing 512, having an acoustic interface 570a and an acoustic interface 570b.

The rotary fluid effector 500 includes an acoustic transceiver 530. The acoustic transceiver 530 includes an acoustic transmitter system configured to emit an emitted acoustic waveform 532a through the housing 512 toward the acoustic interface 570a. The acoustic transceiver 530 also includes an acoustic receiver system configured to detect a reflected acoustic waveform 533a based on a reflection of the emitted acoustic waveform 532a off the acoustic interface 570a.

The acoustic transceiver 530 is also configured to emit an emitted acoustic waveform 532b through the housing 512 toward the acoustic interface 570b of the region 560. The acoustic transceiver 530 also includes an acoustic receiver system configured to detect a reflected acoustic waveform 533b based on a reflection of the emitted acoustic waveform 532b off the acoustic interface 570b. In the illustrated example, the acoustic transceiver 530 is configured to perform the transmission and receipt of the acoustic waveforms 532a, 532b, 533a, and 533b (e.g., by "ringing" the housing 512 at a single location and having the emitted waveforms 532a-532b propagate away from both sides), but in some embodiments separate acoustic transceivers can be used (e.g., one configured to ring the periphery of the housing 512 in a clockwise direction and another configured to ring the periphery in a counter-clockwise direction).

The acoustic transceiver 530 is configured to be activated by an external system such as the example signal processor 150 of FIG. 1, and provide signals based on the reflected acoustic waveforms 533a-533b to the external system for processing. In some embodiments, a single transducer (e.g., a piezo element) can perform the functions of both the acoustic transmitter and the acoustic receiver. In some embodiments, the acoustic transmitter and the acoustic receiver can be discrete components.

The process of determining the position of the moveable body 518 is similar to that of the process described in relation to the example linear fluid effector 300 of FIG. 3, except that instead of transmitting and receiving the acoustic waveforms 332a, 332b, 333a, and 333b along the longitudinal length of the housing 312 as in the example linear fluid effector 300, the acoustic waveforms 532a, 532b, 533a, and 533b are transmitted circumferentially (e.g., orbitally) about the housing 512. The emitted acoustic waveforms 532a and 532b are reflected by the acoustic interface 521 as the reflected acoustic waveforms 533a and 533b.

In use, the times of flight of the emitted acoustic waveforms 532a and 532b, and their return as the reflected acoustic waveforms 533a and 533b can be measured (e.g., times-of-flight) and used to determine the ratiometric position (and by extension, the absolute position) of the moveable body 518 and the shaft 519. For example, equations 1-3 discussed above can also be used with the times-of-flight determined from the rotary fluid effector 500.

In some embodiments, the rotary fluid effector 500 can be a rotary vane actuator (RVA) or a rotary valve. In some embodiments, the rotary fluid effector can be modified to be a rotary piston actuator (RPA). For example, emitted waveforms can be transmitted circumferentially about a tubular housing toward the end of a rotary piston that is configured to move about the axis of the housing and define an acoustic interface within a portion of the housing, and the acoustic interface can reflect a portion of the waveforms for use in determining the rotary position of the rotary piston.

Figure 6:
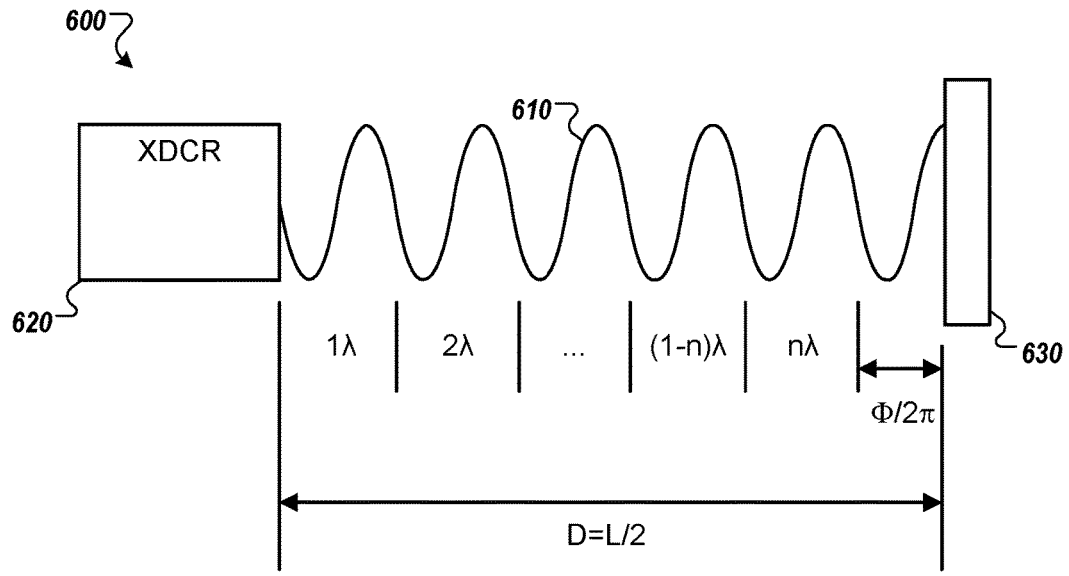
FIG. 6 is a conceptual diagram of a transmitted acoustic waveform.
Figure 7:
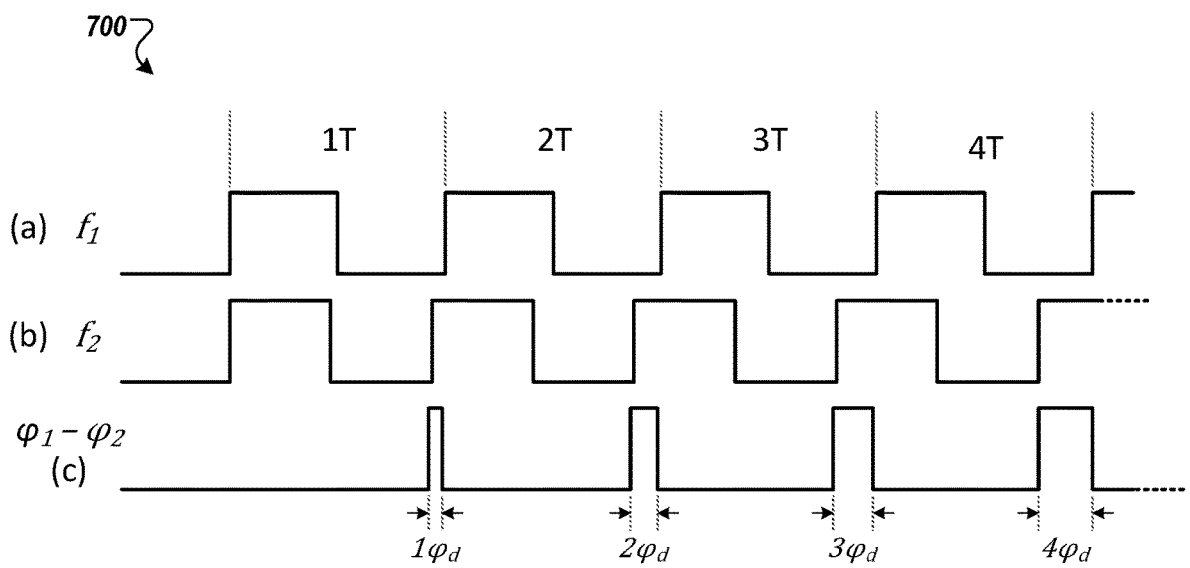
FIG. 7 is a graph showing examples of phase shifts in acoustic waveforms.

FIG. 6 is a conceptual diagram 600 of a transmitted acoustic waveform 610. FIG. 7 is a graph 700 showing examples of phase shifts in acoustic waveforms. In addition to time based measurement (e.g., as discussed above), time and phase are related to one another as a function of frequency and wavelength. In the illustrated example, the transmitted acoustic waveform 610 is transmitted by an acoustic transceiver 620 as a continuous wave of single frequency f. The transmitted acoustic waveform 610 is broadcast toward a moveable reflector 630 positioned at some distance D from the reflector. The transmitted acoustic waveform 610 is reflected back toward the acoustic transceiver 620, and reaches the acoustic transceiver 620 after making a round trip of length L=2D.

The acoustic transceiver 620 travels some whole number n of wavelengths plus a fraction, where wavelength is given by:

$$\lambda = c/f \text{ where } c = \text{sound speed}, f = \text{wave frequency} \quad \text{(Equation 4)}$$

Using Equation 4, the round trip distance to target can be written as:

$$D = \left(n_1 + \frac{\phi}{2\pi}\right) \times \frac{\lambda}{2} \quad \text{(Equation 5)}$$

$$\phi_1 = 2\pi f_1 T_1 = \frac{4\pi f_1 d_1}{c} \quad \text{(Equation 6)}$$

$$T_1 = \frac{\phi_1}{2\pi f_1} \quad \text{(Equation 7)}$$

$$\phi_2 = 2\pi f_2 T_2 = \frac{4\pi f_2 d_2}{c} \quad \text{(Equation 8)}$$

$$T_2 = \frac{\phi_2}{2\pi f_2} \quad \text{(Equation 9)}$$

Where the $\phi/2\pi$ term is equivalent to time as shown in Equations 7 and 9. If $n_1=0$, Equation 2 is unambiguous and since the frequency f and fluid sound speed are known apriori, D can be determined by direct measurement of the phase of the received signal relative to the transmitted signal.

When $n_1>1$, D is ambiguous as the measured phase values repeat at intervals of $2\pi f$. The value $n_1$ can be extracted from the measured data based on the idea that the differential phase shift of two simultaneously propagating waves of differing frequencies will generate progressively larger phase shifts; the value of the increase is a constant $\varphi_d$ as the travel time increases. This is shown in FIG. 7. Detecting the two signals at some distance D and knowing they began traveling at the same time the measured phase can be divided by $\varphi_d$ to extract the number of complete wave periods that occurred to generate the measured phase difference. Mathematically:

$$|\phi_1 - \phi_2| = D\left(\frac{1}{\lambda_1} - \frac{1}{\lambda_2}\right) = \frac{\Delta\phi}{2\pi} \quad \text{(Equation 10)}$$

The phase difference embodiment modifies the time difference embodiment by applying a fixed frequency $f_1$ to the phase measurement in one of the fluid chambers, and another fixed frequency $f_2$ to the other fluid chamber. The exact frequency values of $f_1$ and $f_2$ are not critical to the function of the invention, however it is critical that the frequencies are selected to ensure that $n_1=n_2$ or $n_1=n_2+1$. This relationship ensures that the value of god remains constant over the entire measurement range.

Rewriting Equation 3, using Equations 7 and 9:

$$\text{Stroke} \sim \frac{t_1 - t_2}{t_1 + t_2} \sim \frac{\frac{\phi_1}{2\pi f_1} - \frac{\phi_2}{2\pi f_2}}{\frac{\phi_1}{2\pi f_1} + \frac{\phi_2}{2\pi f_2}} = \frac{\left|\phi_1 - \frac{f_1}{f_2}\phi_2\right|}{\left|\phi_1 + \frac{f_1}{f_2}\phi_2\right|} \quad \text{(Equation 11)}$$

The phase embodiment maintains the same ratiometric benefits of mechanical length and sound speed insensitivity as the time of flight embodiment. The frequency $f_1$ is related to $f_2$ by a fixed ratio. This condition ensures the relative phase difference remains constant with circuit aging and temperature change. Other embodiments can remove this restriction with the result of reduced aging performance and temperature compensation without substantively altering the method.

Ultrasonic pulses are emitted periodically as is prescribed for position measurement. Following each emission, the returned echo signal is sampled at a fixed delay after the emission. From Equations 13 and 14, this delay defines the depth.

As the actuator moves between the successive emissions the sampled values taken at time $T_s$ will change over the time. As the speed information is available only periodically, the technique is limited by the Nyquist theorem. This means that a maximum speed exists for each pulse repetition frequency ($F_{prf}$):

$$V_{max} = \frac{F_{prf} * C}{4 * F_e * \cos\delta} \quad \text{(Equation 12)}$$

The maximum measurable depth is also defined by the pulsed repetition frequency:

$$P_{max} = \frac{C}{2 * F_{prf}} \quad \text{(Equation 13)}$$

Therefore the product of $P_{max}$ and $V_{max}$ is constant, and is given by:

$$P_{max} * V_{max} = \frac{C^2}{8 * F_s * \cos\delta} \quad \text{(Equation 14)}$$

Figure 8:
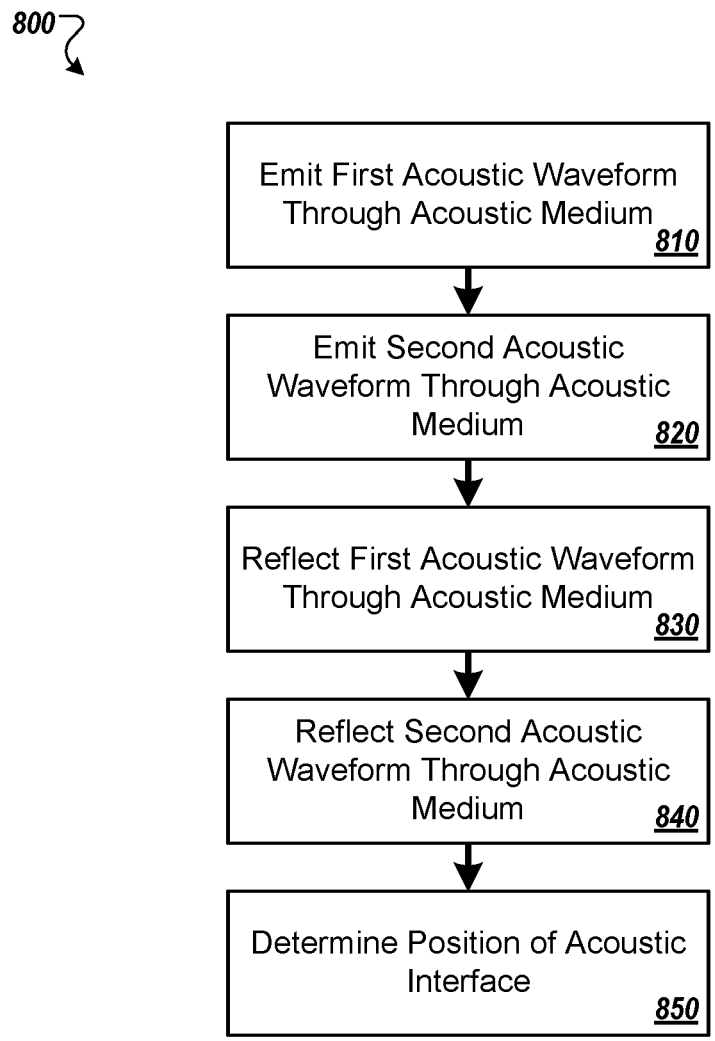
FIG. 8 is a flow diagram of an example process for ultrasonic position sensing.

FIG. 8 is a flow diagram of an example process 800 for ultrasonic position sensing. In some implementations, the process 800 can be performed by all or part of the example system 100 of FIG. 1, the example fluid effector 110, the example linear fluid effector 200 of FIG. 2, the example linear fluid effector 300 of FIG. 3, or the example rotary fluid effector 500 of FIG. 5.

At 810, a first emitted acoustic waveform is emitted in a first direction through an acoustic medium having a first acoustic impedance toward a first side of an acoustic interface. For example, the acoustic transceiver 130a can emit the emitted acoustic waveform 132a toward the face 120 of the moveable body 118 through a fluid in the cavity 116. In another example, the acoustic transceiver 530 can emit the emitted acoustic waveform 532a toward the acoustic interface 570a of the moveable body 518 through the housing 512.

At 820, a second emitted acoustic waveform is emitted in a second direction, opposite the first direction, through the acoustic medium toward a second side of the acoustic interface opposite the first side. For example, the acoustic transceiver 130b can emit the emitted acoustic waveform 132b toward the face 122 of the moveable body 118 through a fluid in the cavity 116. In another example, the acoustic transceiver 530 can emit the emitted acoustic waveform 532b toward the acoustic interface 570b through the housing 512.

At 830, a first reflected acoustic waveform is reflected by the acoustic interface in the second direction based on the first emitted acoustic waveform. For example, the face 120 can reflect the reflected acoustic waveform 133a back toward the acoustic transceiver 130a. In another example, the acoustic interface 570a can reflect the reflected acoustic waveform 533a back toward the acoustic transceiver 530.

At 840, a second reflected acoustic waveform is reflected by the acoustic interface in the first direction based on the second emitted acoustic waveform. For example, the face 122 can reflect the reflected acoustic waveform 133b back toward the acoustic transceiver 130b. In another example, the acoustic interface 570b can reflect the reflected acoustic waveform 533b back toward the acoustic transceiver 530.

At 850, a first position of the acoustic interface is determined based on the first reflected acoustic waveform and the second acoustic waveform. For example, measurements based on the emitted acoustic waveforms 132a, 132b, 133a, and 133b, or the acoustic waveforms 532a, 532b, 533a, and 533b can be used with Equations 1-14 to determine the positions of the moveable bodies 118 or 518.

In some implementations, the process 800 can also include determining a first time of flight based on the first emitted acoustic waveform and the first reflected acoustic waveform, and determining a second time of flight based on the second emitted acoustic waveform and the second reflected acoustic waveform, where determining a first position of the acoustic interface is further based on the first time of flight and the second time of flight. In some implementations, determining the first position of the acoustic interface based on the first time of flight ($t_1$) and the second time of flight ($t_2$) is given by an equation: $(t_1-t_2)/(t_1+t_2)$. For example, Equation 3 shows an example of how times of flight of reflected acoustic waveforms can be used to determine a ratiometric position of the acoustic interface that caused the reflections.

In some implementations, the process 800 can also include determining a second position of the acoustic interface, and determining a speed of the acoustic interface based on the first positon and the second position. For example, by determining a first position of the moveable body 118, a second position of the moveable body 118, and the amount of time between the two positions, a speed at which the moveable body 118 is moving can be determined.

In some implementations, the process 800 can include determining a reflected acoustic frequency based on one or both of the first reflected acoustic waveform and the second acoustic waveform, and determining a speed of the acoustic interface based on the determined reflected acoustic frequency and a predetermined emitted acoustic frequency of one or both of the first emitted acoustic waveform and the second emitted acoustic waveform. For example, the emitted acoustic waveforms 132a and 132b can be emitted at a predetermined emitted frequency, and movement of the example moveable body 118 can cause a Doppler shift in the reflected acoustic waveforms 133a and 113b. The degree of the Doppler shift can be measured to determine a speed of the moveable body 118 relative to the acoustic transceivers 130a and 130b.

In some implementations, the acoustic medium can be a fluid having a first acoustic impedance, the acoustic interface can be defined by a moveable body within a fluid effector and having a second acoustic impedance that is different than the first acoustic impedance, the first emitted acoustic waveform can be emitted toward a first face of the moveable body through the fluid, the second emitted acoustic waveform can be emitted toward a second face of the moveable body, arranged opposite the first face, through the fluid, the first reflected acoustic waveform can be based on a first reflection of the first emitted acoustic waveform by the first face, and the second reflected acoustic waveform can be based on a second reflection of the second emitted acoustic waveform by the second face. For example, the emitted acoustic waveforms 132a and 132b can travel through a fluid in the cavity 116 to the face 120 and the face 122, and be reflected back through the fluid to the acoustic transceivers 130a and 130b.

In some implementations, the acoustic medium can be a housing of a fluid effector, the housing having a first acoustic impedance and defining a cavity, and also including contacting a portion of the housing with a moveable body configured for movement within the cavity, and modifying, based on the contacting, the first acoustic impedance of the contacted portion of the housing to define a portion of the housing having a second acoustic impedance that is different from the first acoustic impedance, where the contacted portion of the housing defines the acoustic interface. For example, contact between the example seal 419 and the example housing 412 can develop the region of modified acoustic impedance 460.

In some implementations, the process 800 can also include determining a phase difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform, wherein determining a first position of the acoustic interface is further based on the determined phase difference. For example, the differences in phase between the emitted acoustic waveform 132a and the reflected acoustic waveform 133a can be used (e.g., in the example Equations 4-14) to determine a position of the moveable body 118.

All of the embodiments described can provide, in addition to position, direct measurement of actuator speed by the incorporation of signal processing to extract Doppler shift information (e.g., reflected frequency) from the transducer(s) signals. While only one of the plurality of transducers is required to be processed, Doppler processing of two transducers can provide higher accuracy by a factor of about 1.4× over the use of a single channel.

Figure 9:
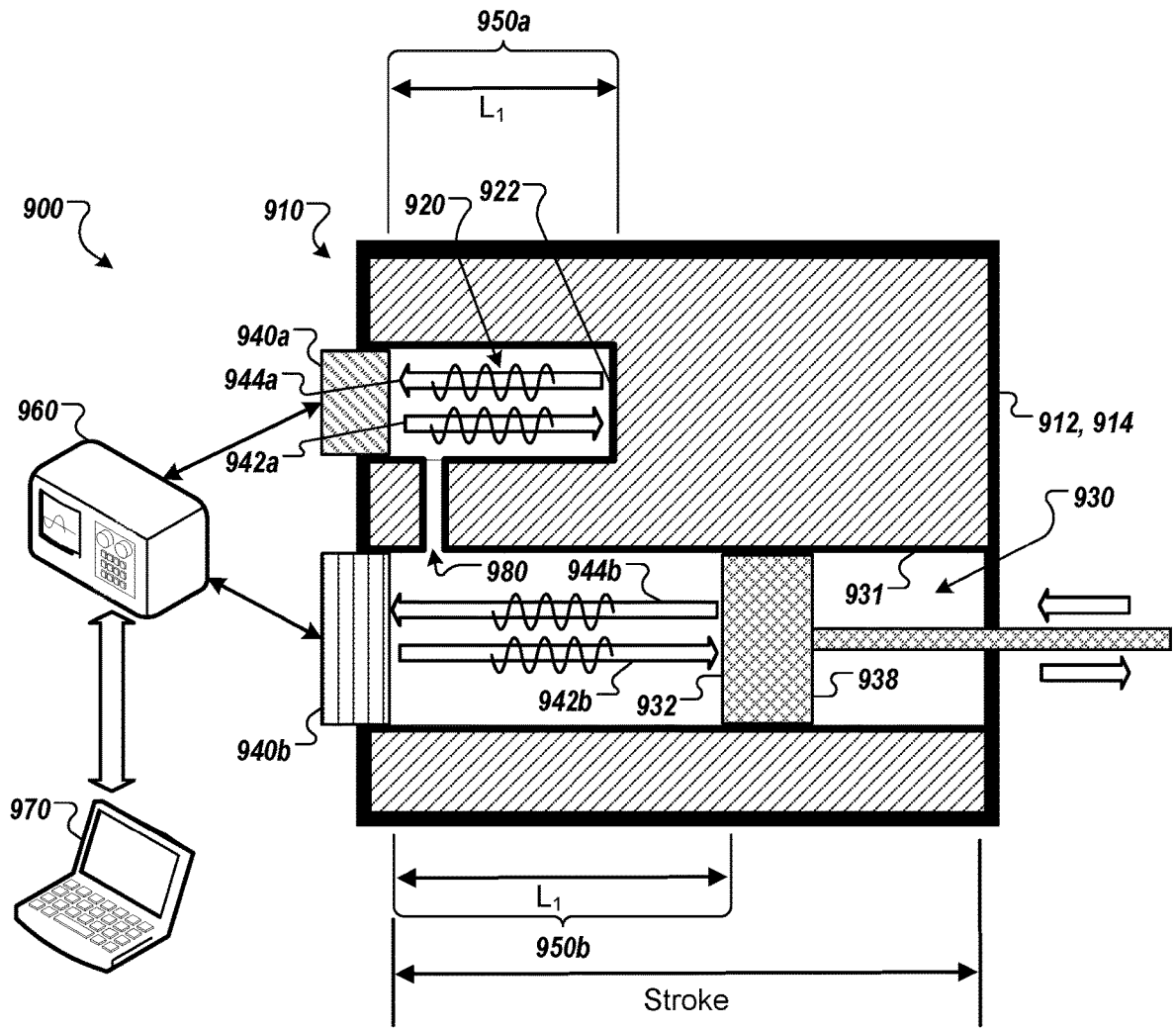
FIG. 9 shows another example of a system for ultrasonic position measurement.

FIG. 9 shows an example of a system 900 for ultrasonic position measurement (e.g., a position sensor system). The system 900 includes a fluid effector 910. The fluid effector 910 includes a sensor housing 912 defining a cavity 920 having a face 922. The fluid effector 910 also includes an actuator housing 914 having an inner surface 931 defining a cavity 930. The cavities 920 and 930 are fluidically connected by a passage 980. A moveable body 938 is configured for reciprocal movement within the cavity 930. The moveable body 938 has a face 932.

In the illustrated example, the sensor housing 912 and the actuator housing 914 are a unified housing that includes both of the cavities 920 and 930. As will be discussed in the description of FIG. 15, the sensor housing and the actuator housing may be separate housings.

The system 900 includes an acoustic transceiver 940a that is configured as an acoustic transmitter or acoustic emitter to emit an emitted acoustic waveform 942a toward the face 922. The acoustic transceiver 940a is also configured as an acoustic receiver configured to detect a reflected acoustic waveform 944a based on a reflection of the emitted acoustic waveform 942a off the face 922. In some embodiments, a single transducer (e.g., a piezo element) can perform the functions of both the acoustic transmitter and the acoustic receiver. In some embodiments, the acoustic transmitter and the acoustic receiver can be discrete components.

The system 900 includes an acoustic transceiver 940b that is configured as an acoustic transmitter or acoustic emitter to emit an emitted acoustic waveform 942b toward the face 932. The acoustic transceiver 940b is also configured as an acoustic receiver configured to detect a reflected acoustic waveform 944b based on a reflection of the emitted acoustic waveform 942b off the face 932. In some embodiments, a single transducer (e.g., a piezo element) can perform the functions of both the acoustic transmitter and the acoustic receiver. In some embodiments, the acoustic transmitter and the acoustic receiver can be discrete components.

A signal processor 960 is configured to process signals from the acoustic transceiver 940a and the acoustic transceiver 940b to determine the position of the moveable body 938 within the cavity 930. A controller 970 (e.g., a computer) is configured to receive position information from the signal processor 960 and perform functions based on the position information (e.g., control a process, present information to a user, transmit information to another system, record a log). In some embodiments, the signal processor 960 can include a timer (e.g., to measure the times of flight of emitted and reflected signals). In some embodiments, the signal processor 960 can include a phase detector (e.g., to determine phase and/or Doppler shifts in reflected signals).

In general, the fluid effector 910 is configured as a ratiometric position-sensing device. The acoustic transceiver 940a is configured to sound a known, fixed distance 950a to the face 922, whereas the acoustic transceiver 940b is configured to sound the variable distance 950b to the face 932 of the moveable body 938. Time measurements of the two acoustic transceivers 940a, 940b can be used to determine the position of the moveable body 938 when sound speed is known. However, when coupling two transducers into a system, sound speed is cancelled and a ratiometric ultrasound position sensor is obtained. The passage 980 is provided to improve equalization of fluid temperatures in the cavities 920, 930 to improve equalization of the speed of sound in the fluids that occupy the cavities 920, 930. In some implementations, if either transducer fails, redundancy can be obtained through measurement or approximation of sound speed. The techniques for processing the signals, and several embodiments of the fluid effector 910, will be discussed in the descriptions of FIGS. 16-26.

Figure 10:
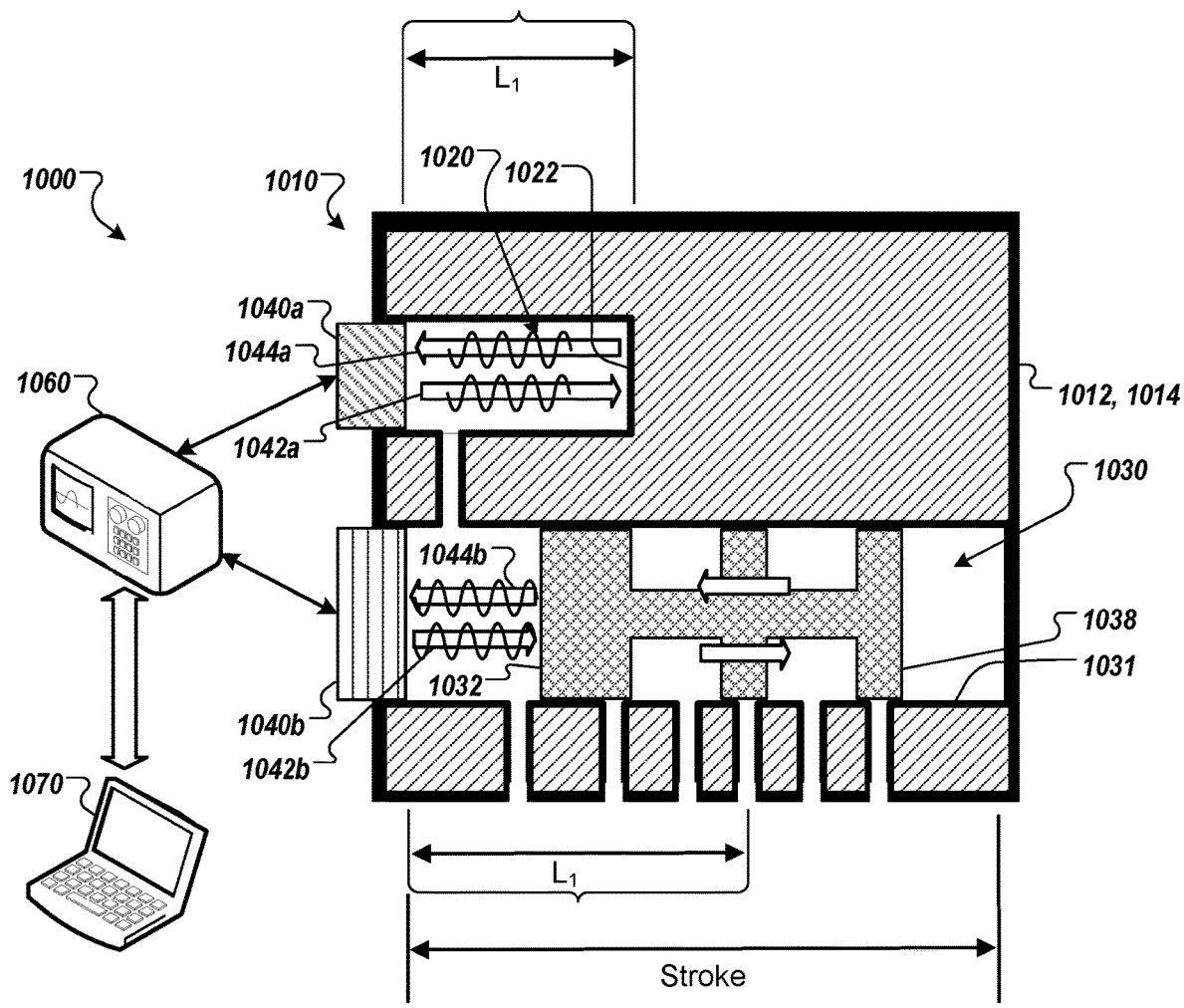
FIG. 10 shows another example of a system for ultrasonic position measurement.

In the illustrated example shown in FIG. 9, the fluid effector is configured as a linear (e.g., piston) actuator. FIG. 10 shows another example of a system 1000 for ultrasonic position measurement. The system 1000 is substantially similar to the example system 900, except the system 1000 includes a fluid effector 1010 that is configured as a valve.

The fluid effector 1010 includes the sensor housing 1012 defining a cavity 1020 having a face 1022. The fluid effector 1010 also includes an actuator housing 1014 having an inner surface 1031 defining a cavity 1030. A moveable body 1038 is configured for reciprocal movement within the cavity 1030. The moveable body 1038 has a face 1032. In the illustrated example, the moveable body 1038 is configured as a valve body.

In the illustrated example, the sensor housing 1012 and the actuator housing 1014 are a unified housing that includes both of the cavities 1020 and 1030. As will be discussed in the description of FIG. 15, the sensor housing and the actuator housing may be separate housings.

The system 1000 includes an acoustic transceiver 1040a that is configured as an acoustic transmitter or acoustic emitter to emit an emitted acoustic waveform 1042a toward the face 1022. The acoustic transceiver 1040a is also configured as an acoustic receiver configured to detect a reflected acoustic waveform 1044a based on a reflection of the emitted acoustic waveform 1042a off the face 1022. In some embodiments, a single transducer (e.g., a piezo element) can perform the functions of both the acoustic transmitter and the acoustic receiver. In some embodiments, the acoustic transmitter and the acoustic receiver can be discrete components.

The system 1000 includes an acoustic transceiver 1040b that is configured as an acoustic transmitter or acoustic emitter to emit an emitted acoustic waveform 1042b toward the face 1032. The acoustic transceiver 1040b is also configured as an acoustic receiver configured to detect a reflected acoustic waveform 1044b based on a reflection of the emitted acoustic waveform 1042b off the face 1032. In some embodiments, a single transducer (e.g., a piezo element) can perform the functions of both the acoustic transmitter and the acoustic receiver. In some embodiments, the acoustic transmitter and the acoustic receiver can be discrete components.

A signal processor 1060 is configured to process signals from the acoustic transceiver 1040a and the acoustic transceiver 1040b to determine the position of the moveable body 1038 within the cavity 1030. A controller 1070 (e.g., a computer) is configured to receive position information from the signal processor 1060 and perform functions based on the position information (e.g., control a process, present information to a user, transmit information to another system, record a log). In some embodiments, the signal processor 1060 can include a timer (e.g., to measure the times of flight of emitted and reflected signals). In some embodiments, the signal processor 1060 can include a phase detector (e.g., to determine phase and/or Doppler shifts in reflected signals).

Figure 11:
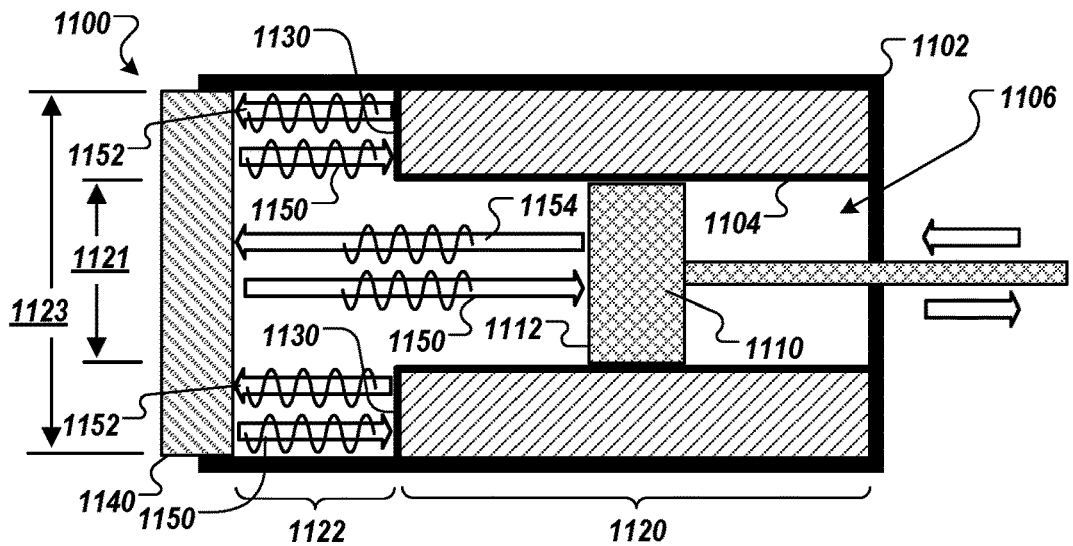
FIG. 11 is a conceptual sectional view of another example linear fluid effector.

FIG. 11 is a conceptual sectional view of an example linear fluid effector 1100. In the illustrated example, the effector 1100 is defined by a housing 1102 with an inner surface 1104 that defines a cavity 1106.

A moveable member 1110 is configured for axial movement within a portion 1120 of the cavity 1106. The portion 1120 is sized to contact the moveable body 1110 and partly define a fluid chamber having a cross-sectional area 1121, and can be pressurized to urge linear movement of the moveable body 1110.

A portion 1122 of the cavity 1106 is arranged axially adjacent to the portion 1120, and has an axial cross-sectional area 1123 that is larger than the cross-sectional area 1121 of the portion 1120. A face portion 1130 is defined by an axial shoulder transition between the cross-sectional area 1121 and the cross-sectional area 1123.

The portion 1120 and the portion 1122 together define a unified cavity in which fluid (e.g., fuel) is free to move between the portions 1120, 1122 and maintain a substantially even distribution of temperatures throughout the cavity 1106. In the illustrated example, the portion 1122 is coaxially larger than the portion 1120 in cross-section. In some embodiments, the portion 1122 may be axially offset asymmetrically from the portion 1122. In some embodiments, the portion 1122 may be at least partly discontinuous from the portion 1120.

An acoustic transceiver 1140 is arranged at an axial end of the housing 1102. The acoustic transceiver 1140 is configured to emit an emitted acoustic signal 1150 toward both the moveable body 1110 and the face portion 1130. The face portion 1130 reflects a portion of the emitted acoustic signal 1150 back toward the acoustic transceiver 1140 as a reflected acoustic signal 1152. The face portion 1112 of the moveable body 1110 reflects another portion of the emitted acoustic signal 1150 back toward the acoustic transceiver 1140 as a reflected acoustic signal 1154.

In operation, a signal processor (e.g., the example signal processor 960 of FIG. 9) can activate the acoustic transceiver 1140 to emit the emitted acoustic signal 1150 and use the acoustic transceiver 1140 to sense the reflected acoustic signals 1152 and 1154. The signal processor can determine a time of flight for both the reflected acoustic signals 1152 and 1154 to determine the position of the moveable body 1110 within the cavity 1106. The techniques for processing the signals will be discussed in the descriptions of FIGS. 16-26.

Figure 12:
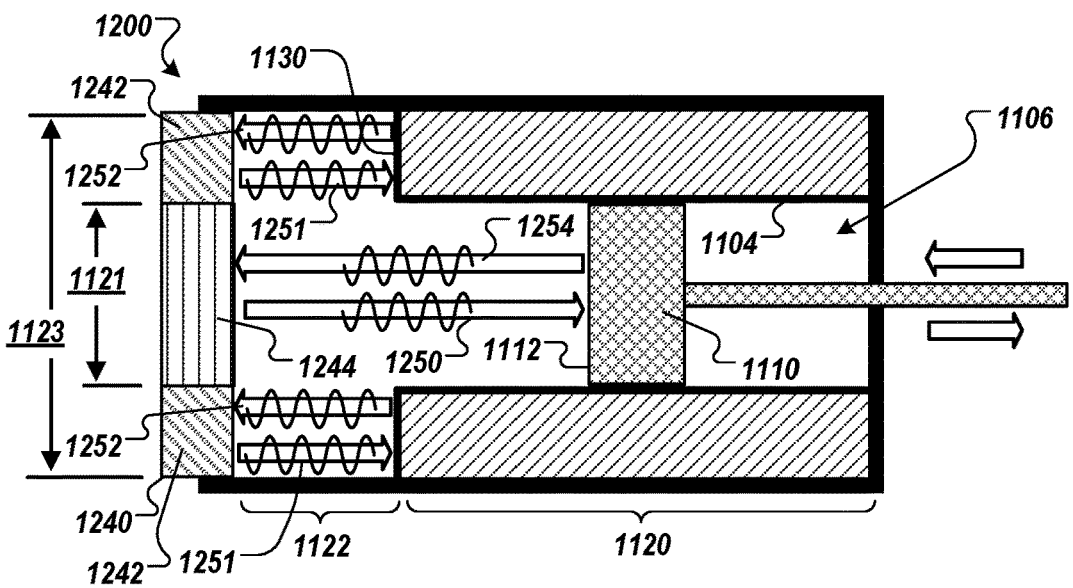
FIG. 12 is a conceptual sectional view of another example linear fluid effector.

FIG. 12 is a conceptual sectional view of another example linear fluid effector 1200. In general, the linear fluid effector 1200 is a modification of the example linear fluid effector 1100 of FIG. 11, in which the acoustic transceiver 1140 has been replaced by an acoustic transceiver 1240.

Figure 13:
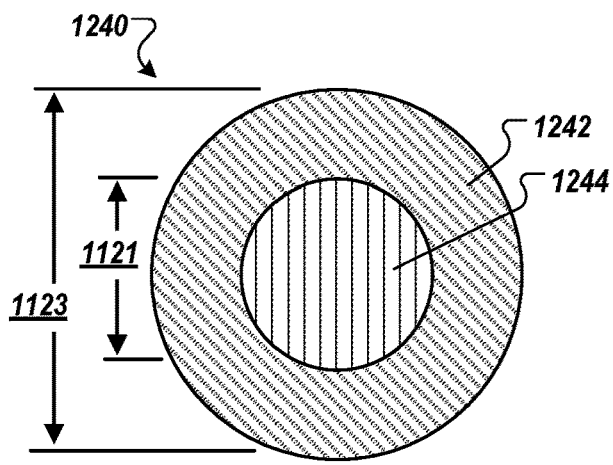
FIG. 13 is an end view of an example transceiver.

FIG. 13 is an end view of the example acoustic transceiver 1240 of FIG. 12. The acoustic transceiver 1240 includes an acoustic transceiver portion 1242 that at least partly coaxially surrounds an acoustic transceiver portion 1244. The acoustic transceiver portion 1242 is sized based on the cross-sectional area 1123, and the acoustic transceiver portion 1244 is sized based on the cross-sectional area 1121. The acoustic transceiver portion 1244 is configured to emit an emitted acoustic signal 1250 toward the moveable body 1110, and the acoustic transceiver portion 1242 is configured to emit an emitted acoustic signal 1251 toward the face portion 1130. The face portion 1130 reflects a portion of the emitted acoustic signal 1251 back toward the acoustic transceiver portion 1242 as a reflected acoustic signal 1252. The face portion 1112 of the moveable body 1110 reflects a portion of the emitted acoustic signal 1250 back toward the acoustic transceiver portion 1244 as a reflected acoustic signal 1254.

The acoustic transceiver portions 1242, 1244 are separately operable and readable by a signal processor (e.g., the example signal processor 960 of FIG. 9). The signal processor can determine a time of flight for both the reflected acoustic signals 1252 and 1254 to determine the position of the moveable body 1110 within the cavity 1106. The techniques for processing the signals will be discussed in the descriptions of FIGS. 16-26.

Figure 14:
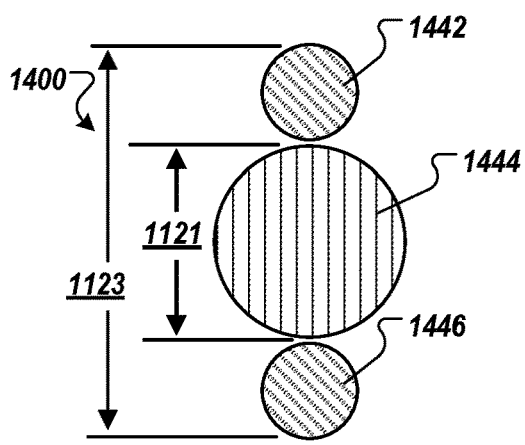
FIG. 14 is an end view of another example transceiver.

FIG. 14 is an end view of another example acoustic transceiver 1400. In some embodiments, the acoustic transceiver 1400 can be substituted for the example acoustic transceiver 1240 of FIGS. 12-13.

The acoustic transceiver 1400 includes an acoustic transceiver portion 1242 that is radially offset from an acoustic transceiver portion 1444. The acoustic transceiver portion 1442 is sized based on the cross-sectional area 1121, and the acoustic transceiver portion 1444 is sized based on the cross-sectional area 1123. The acoustic transceiver portion 1444 is configured to emit an emitted acoustic signal toward the example moveable body 1110, and the acoustic transceiver portion 1442 is configured to emit an emitted acoustic signal toward the example face portion 1130. The face portion 1130 reflects a portion of the acoustic signal emitted by the acoustic transceiver portion 1442 back toward the acoustic transceiver portion 1442 as a reflected acoustic signal. The face portion 1112 of the moveable body 1110 reflects a portion of the acoustic signal emitted by the acoustic transceiver portion 1444 back toward the acoustic transceiver portion 1444 as a reflected acoustic signal.

The acoustic transceiver portions 1442, 1444 are separately operable and readable by a signal processor (e.g., the example signal processor 960 of FIG. 9). The signal processor can determine a time of flight for both the reflected acoustic signals to determine the position of the moveable body 1110 within the cavity 1106. The techniques for processing the signals will be discussed in the descriptions of FIGS. 16-26.

The acoustic transceiver 1440 also includes an acoustic transceiver portion 1446 that is radially offset from an acoustic transceiver portion 1444. The acoustic transceiver portion 1444 is sized based on the cross-sectional area 1123. The acoustic transceiver portion 1446 is configured to emit an emitted acoustic signal toward the example face portion 1130. The face portion 1130 reflects a portion of the acoustic signal emitted by the acoustic transceiver portion 1446 back toward the acoustic transceiver portion 1446 as a reflected acoustic signal. In some embodiments, the acoustic transceiver portions 1442 and 1146 are part of a single acoustic transceiver device that is separately operable and measurable from the acoustic transceiver portion 1444. In some embodiments, the acoustic transceiver portion 1446 is separately operable and measurable from the acoustic transceiver portion 1442 and 1144. For example, the acoustic transceiver portion 1446 can be used redundantly in cooperation with the acoustic transceiver portion 1442.

Figure 15:
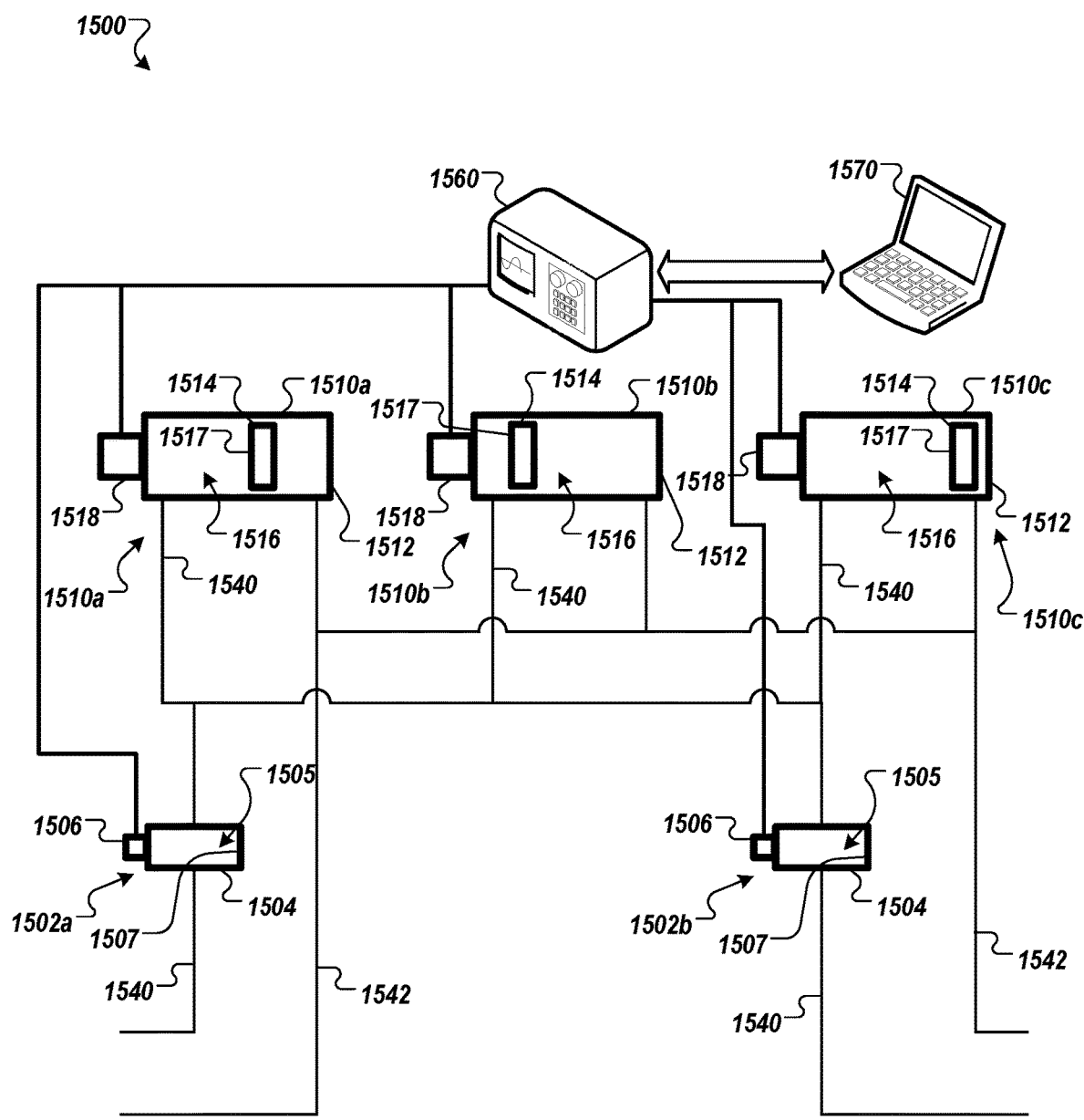
FIG. 15 is a schematic diagram of an example fluid effector system.

FIG. 15 is a schematic diagram of an example fluid effector system 1500. The system 1500 includes an acoustic fluid measurement module 1502a and an acoustic fluid measurement module 1502b. Each of the acoustic fluid measurement modules 1502a, 1502b includes a sensor housing 1504 that defines a cavity 1505 having a predetermined length and a face 1507, and an acoustic transceiver 1506 configured to perform a time-of-flight measurement of the length of the cavity 1505. The acoustic fluid measurement modules 1502a, 1502b are operable and readable by a signal processor 1560 and a controller 1570 to determine time of flight of acoustic signals within the acoustic fluid measurement modules 1502a, 1502b. In some embodiments, the acoustic fluid measurement modules 1502a, 1502b can provide functionality similar to that of the example acoustic transceivers 940a and/or 1040a of FIGS. 9 and 10.

The system 1500 also includes a collection of fluid effectors 1510a-1510c, each having an actuator housing 1512 defining a cavity 1516 in which a moveable body 1514 having a face 1517 is configured to move axially. In various embodiments, each of the fluid effectors 1510a-1510c can be any appropriate form of fluid effector, such as a linear fluid actuator or a fluid actuated valve. Each of the fluid effectors 1510a-1510c also includes an acoustic transceiver 1518 configured to perform a time-of-flight measurement of the length of the cavity 1516. The acoustic transceivers 1518 are operable and readable by the signal processor 1560 and the controller 1570 to determine times of flights of acoustic signals within fluid effectors 1510a-1510c. In some embodiments, the acoustic transceivers 1518 can provide functionality similar to that of the example acoustic transceivers 940b and/or 1040b of FIGS. 9 and 10.

In the illustrated example, the system 1500 is shown with two acoustic fluid measurement modules and three fluid effectors, though any appropriate number of one or more acoustic fluid measurement modules and any appropriate number of one or more fluid effectors can be used. For example, a single acoustic fluid measurement module can be used to provide a baseline measurement, or multiple acoustic fluid measurement modules can be used to provide redundancy. In another example, one or more baseline measurements from one or a collection of acoustic measurement modules can be used with one, two, three, five, ten, twenty, or any other appropriate number of fluid effectors.

In very general terms, the acoustic fluid measurement modules 1502a, 1502b can be used to provide (e.g., redundant) baseline measurements against which the measurements by the acoustic transceivers 1518 can be compared to determine the positions of the moveable bodies 1514. In operation, operative fluid (e.g., fuel) flows along a supply passage 1540, through the acoustic fluid measurement modules 1502a, 1502b to the fluid effectors 1510a-1510c, and out through a return passage 1542. The signal processor 1560 can activate the acoustic transceivers 1506 to emit emitted acoustic signals and use the acoustic transceivers 1506 to sense the reflected acoustic signals. The signal processor can determine a time of flight of the reflected acoustic signals within the known lengths of the cavities 1505. The signal processor 1560 can activate the acoustic transceivers 1518 to emit emitted acoustic signals and use the acoustic transceivers 1518 to sense the reflected acoustic signals to determine the times of flights of the signals due to the positions of the moveable bodies 1514 within the cavities 1516. The signal processor 1560 can compare the times of flights from the acoustic fluid measurement modules 1502a, 1502b to the times of flights from the fluid effectors 1510a-1510c to determine the positions of the moveable bodies 1514 within the cavities 1516. The techniques for processing the signals will be discussed in the descriptions of FIGS. 16-26.

FIGS. 16-26 show examples of various systems that can be used to perform positional measurement and control using apparatus such as the examples shown and described above.

To improve system sizing, two ultrasound sensors are implemented on either chamber of a fluid effector. The ultrasound sensor transmits a signal which reflects off the effector and is received by the transducer. The measured time in conjunction with the sound speed defines the distance to the effector (see Equation 1). When coupling two transducers together the other chamber follows the same form (see Equation 2).

The transducers and the effector can be configured such that the signals are used as a ratio metric device, rather:

$$\text{Stroke} \sim \frac{t_1 - t_2}{t_1 + t_2} \sim \frac{\frac{L_1}{C_1} - \frac{L_2}{C_2}}{\frac{L_1}{C_1} + \frac{L_2}{C_2}} \qquad \text{(Equation 15)}$$

Since $C_1 \sim C_2$, as a ratio metric device, the effects of sound speed characteristics are cancelled out and not required for evaluation of position. In addition to time based measurement, time, and phase are related to one another as a function of frequency and wavelength. A continuous wave of single frequency f is broadcast toward a moveable reflector positioned at some distance D from the reflector. The wave is reflected back toward the transducer and reaches the transducer after making a round trip of length L=2D. The wave travels some whole number n of wavelengths plus a fraction, where wavelength is given by:

$$\lambda = \frac{c}{f} \qquad \text{(Equation 16)}$$

Where c=sound speed, and f=wave frequency. Using Equation 16, the round trip distance to target can be written as:

$$D = \left(n_1 + \frac{\phi}{2\pi}\right) \times \frac{\lambda}{2} \qquad \text{(Equation 17)}$$

$$\phi_1 = 2\pi f_1 T_1 = \frac{4\pi f_1 d_1}{c} \qquad \text{(Equation 18)}$$

$$T_1 = \frac{\phi_1}{2\pi f_1} \qquad \text{(Equation 19)}$$

$$\phi_2 = 2\pi f_2 T_2 = \frac{4\pi f_2 d_2}{c} \qquad \text{(Equation 20)}$$

$$T_2 = \frac{\phi_2}{2\pi f_2} \quad \text{(Equation 21)}$$

Where the $\phi/2\pi$ term is equivalent to time as per (19) and (21). If $n_1=0$, (15) is unambiguous and since the frequency f and fluid sound speed are known a priori D can be determined by direct measurement of the phase of the received signal relative to the transmitted signal.

When $n_1>1$, D is ambiguous as the measured phase values repeat at intervals of $2\pi f$. The value $n_1$ can be extracted from the measured data based on the idea that the differential phase shift of two simultaneously propagating waves of differing frequencies will generate progressively larger phase shifts; the value of the increase is a constant $\varphi_d$ as the travel time increases. Detecting the two signals at some distance D and knowing they began traveling at the same time the measured phase can be divided by $\varphi_d$ to extract the number of complete wave periods that occurred to generate the measured phase difference.

Mathematically, $$|\phi_1 - \phi_2| = D\left(\frac{1}{\lambda_1} - \frac{1}{\lambda_2}\right) = \frac{\Delta\phi}{2\pi} \quad \text{(Equation 22)}$$

The phase difference embodiment modifies the time difference embodiment by applying a fixed frequency $f_1$ to the phase measurement in one of the fluid chambers, and another fixed frequency $f_2$ to the other fluid chamber. The exact frequency values of $f_1$ and $f_2$ are not critical to the function of the invention, however it is critical that the frequencies are selected to ensure that $n_1=n_2$ or $n_1=n_2+1$. This relationship ensures that the value of $\varphi_d$ remains constant over the entire measurement range.

Rewriting (15) using (19), (21):

$$\text{Stroke} \sim \frac{\frac{\phi_1}{2\pi f_1} - \frac{\phi_2}{2\pi f_2}}{\frac{\phi_1}{2\pi f_1} + \frac{\phi_2}{2\pi f_2}} = \left|\frac{\phi_1 - \frac{f_1}{f_2}\phi_2}{\phi_1 + \frac{f_1}{f_2}\phi_2}\right| \quad \text{(Equation 23)}$$

The phase embodiment maintains the same ratiometric benefits of mechanical length and sound speed insensitivity as the time of flight embodiment. The frequency $f_1$ is related to $f_2$ by a fixed ratio. This condition ensures the relative phase difference remains constant with circuit aging and temperature change. Other embodiments can remove this restriction with the result of reduced aging performance and temperature compensation without substantively altering the method.

As an extension of the linearized ratio metric position sensors of FIG. 1-8, a modification can be made to place the transceiver elements in more preferential locations. In the examples of FIGS. 9-15, this is achieved by positioning a transceiver element (XDCR1) in reflective communication with an effector, and a second transceiver element (XDCR2) located in a static chamber sharing common fluid (e.g., fuel), and therefore approximate physical properties with the first transceiver element (XDCR1). The result of a static reference is a logarithmic differential/sum output which will be outlined below. The transceiver element XDCR1 transmits a signal which reflects off the effector and is received by the transceiver. The measured time in conjunction with the sound speed defines the distance to the effector:

$$L_1 = t_1 \times C_1 \quad \text{(Equation 24)}$$

The transceiver element XDCR2 of the static chamber follows a similar form:

$$L_2 = t_2 \times C_2 \quad \text{(Equation 25)}$$

The fuel of the second transceiver element XDCR2 in the static chamber is supplied from a shared source as the first transceiver element XDCR1. The transducers and the effector can be configured such that the signals are used as a ratiometric device, rather:

$$\text{Stroke} \sim \frac{t_1 - t_2}{t_1 + t_2} \sim \frac{\frac{L_1}{C_1} - \frac{L_2}{C_2}}{\frac{L_1}{C_1} + \frac{L_2}{C_2}} \quad \text{(Equation 26)}$$

Since $C_1 \sim C_2$, as a ratio metric device, the effects of sound speed characteristics are cancelled out and not required for evaluation of position. XDCR1 monitors the dynamical position of an effector while XDCR2 acts as a constant distance reference. In some configurations XDCR1 and XDCR2 can be the same transceiver element, with output energy divided between appropriate surfaces. As a result, the output of equation 26 is logarithmic. A sample logarithmic output is provided in FIG. 19.

All of the embodiments described can provide, in addition to position, direct measurement of actuator velocity and/or actuator acceleration by the incorporation of signal processing using multiple position samples and/or by extracting Doppler shift information from the transducer(s) signals. Only one of the plurality of transducers is required to be processed, however. Doppler processing of two transducers provides higher accuracy by a factor of 1.4× over a single channel.

Ultrasonic pulses are emitted periodically as is prescribed for position measurement. Following each emission, the returned echo signal is sampled at a fixed delay after the emission. From equations (25) and (26), this delay defines the depth.

As the actuator moves between the successive emissions, the sampled values taken at time $T_s$ will change over the time. Unfortunately, as the velocity information is available only periodically, the technique is limited by the Nyquist theorem. This means that a maximum velocity exists for each pulse repetition frequency ($F_{prf}$):

$$V_{max} = \frac{F_{prf} C}{4 F_e \cos\delta} \quad \text{(Equation 27)}$$

The maximum measurable depth is also defined by the pulsed repetition frequency:

$$P_{max} = \frac{C}{2 F_{prf}} \quad \text{(Equation 28)}$$

Therefore the product of $P_{max}$ and $V_{max}$ is constant, and is given by:

$$P_{max} \times V_{max} = \frac{C}{8 F_\theta \cos \delta} \qquad \text{(Equation 29)}$$

Figure 16:
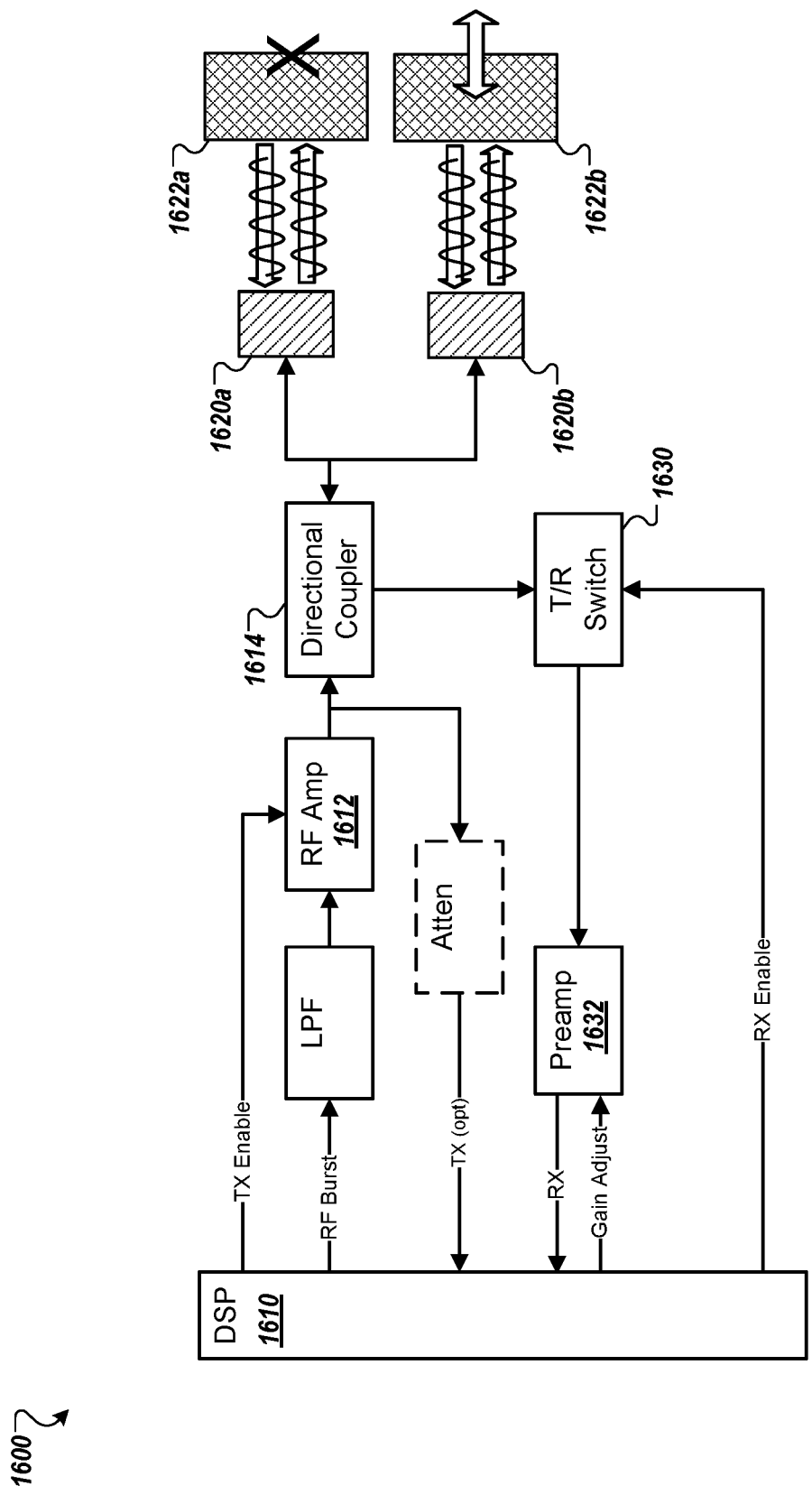
FIG. 16 is a block diagram of an example transducer controller.

FIG. 16 is a block diagram of an example transducer controller 1600. The illustrated example outlines a digital solution to achieving time transits and signal processing. In the sample provided, a digital core 1610 (e.g., a DSP) outputs a signal RX burst signal and a TX enable signal. An RF amplifier 1612 is energized and amplifies the RX burst signal to appropriate voltages for the respective sensing system. The amplified signal then passes through a directional coupler 1614 and excites a pair of transceiver elements 1620a, 1620b. In some implementations, a directional coupler or some other blocking circuit can be placed in the transmission line to block or limit the echo signals from each transducer from feeding back to the opposite transducer or to the pulse generator. The desired signals returning from a pair of reflective surfaces 1622a, 1622b is passed through the direction coupler 1614, through a T/R switch 1630 and amplified through a pre-amp 1632 to usable voltage levels prior to receipt at the digital core 1610. Within the digital core 1610 digital signal processing is completed for determination of time transits and ultimately ratio metric position of the effector, linear or logarithmic. With the digital core 1610 accessible, complex DSP tasks can be performed enabling the determination of effector parameters such as velocity, acceleration, and health monitoring prognostics.

However, in certain aerospace and other high-temperature harsh-environment applications, ambient temperatures can exceed the capabilities of silicon-based semiconductors. In some embodiments, DSP-based correlation processors, memory, ADC/DAC, and other standard components needed to support such a system may not currently exist in a form that can withstand such harsh environmental conditions. An advantage of an analog correlator is that it can process signals in real time and provide a continuous voltage output at low frequency, and can reduce or eliminate the need for an ADC, sampled data processing, memory, and/or discrete arithmetic methods. Analog correlators can therefore be well suited for high-temperature implementation in wide-bandgap (WBG) semiconductor processes. This opens the potential for implementation of a complete time-of-flight correlation system using WBG semiconductors capable of supporting the required level of device integration with existing IC process technologies.

Figure 17:
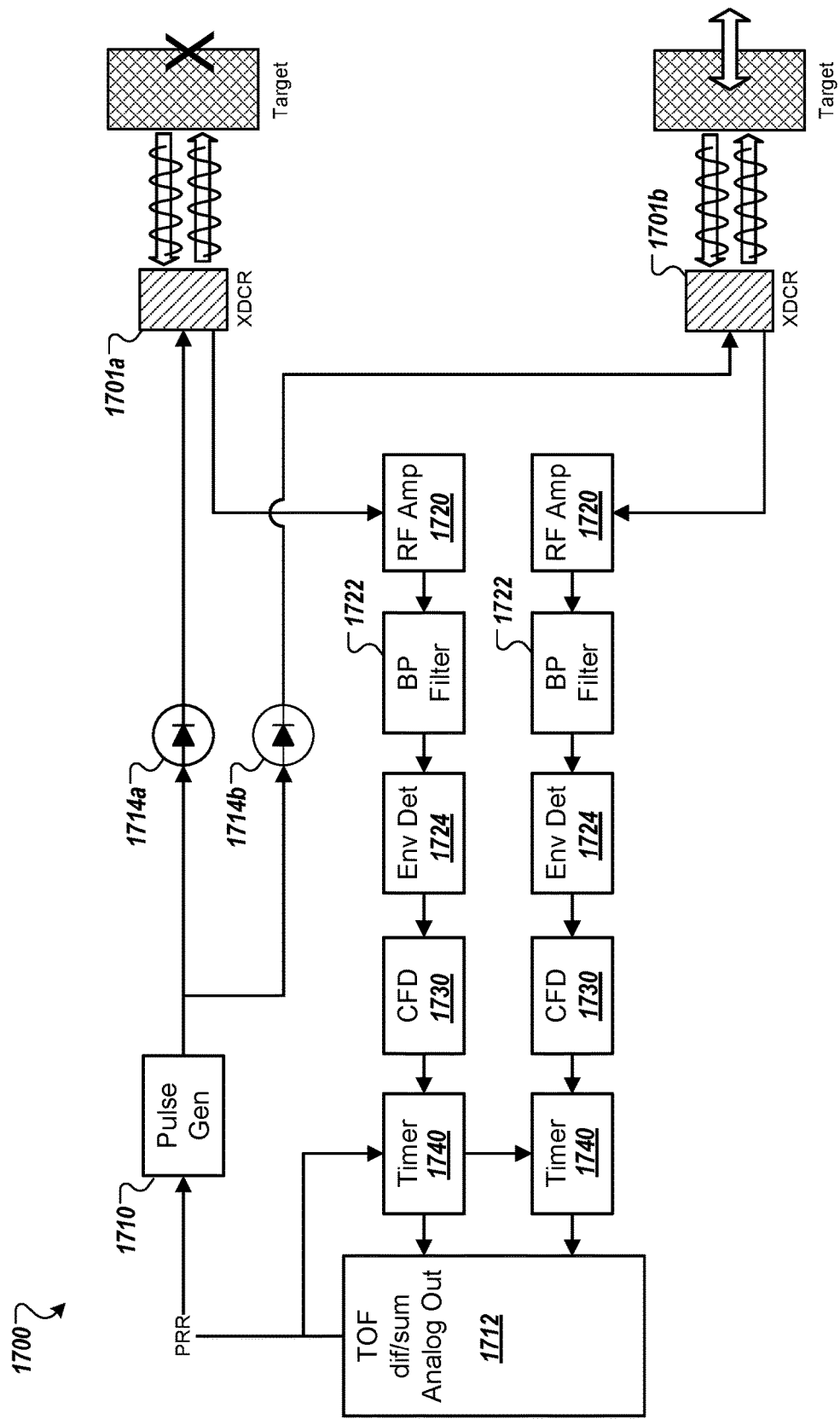
FIG. 17 is a block diagram of another example transducer controller.

FIG. 17 is a block diagram of another example transducer controller 1700. The illustrated example shows an embodiment of a transducer controlling circuit using an analog approach in the time domain. This circuit excites transducers 1701a, 1701b simultaneously and then measures the time difference between return echoes from the two transducers. The output from the circuit is the difference as a ratio metric voltage proportional to the relative position of the two targets. A detailed description of the functional blocks follows.

A pulse generator 1710 is triggered by a pulse repetition rate (PRR) signal synchronized with the behavior of a time of flight (TOF) difference over sum block 1712 and governed by the TOF physics of the mechanical system. The electrical pulse generated is simultaneously sent to both transducers 1701a, 1701b over a bifurcated transmission line. A pair of directional couplers 1714a, 1714b or some other blocking circuit is placed in the transmission line to block or limit the echo signals from each transducers 1701a, 1701b from feeding back to the opposite transducer or to the pulse generator 1710. The pulse is transformed by each transducer to an ultrasonic incident wave, I1 and I2 respectively. The reflected wave from each transducer, R1 and R2 respectively is transformed back to small voltage signals.

The remaining description will focus on one path of the signal condition circuitry shown in FIG. 17. Both paths behave substantially identically.

A low noise RF amplifier (LNA) 1720 amplifies the weak signal before passing it to a band pass filter 1722 which is designed to allow only the frequencies of interest to be forwarded to the remaining circuit.

An envelope detector 1724 is an amplitude demodulator configured to extract a baseband envelope pulse from a high frequency AC signal. The envelope is then passed through a constant fraction discriminator 1730 (CFD) circuit to a timer 1740 to obtain an amplitude invariant zero-crossing time stamp for the return echo signal.

Signals from both paths shall now again be used for the remainder of this description.

Figure 18:
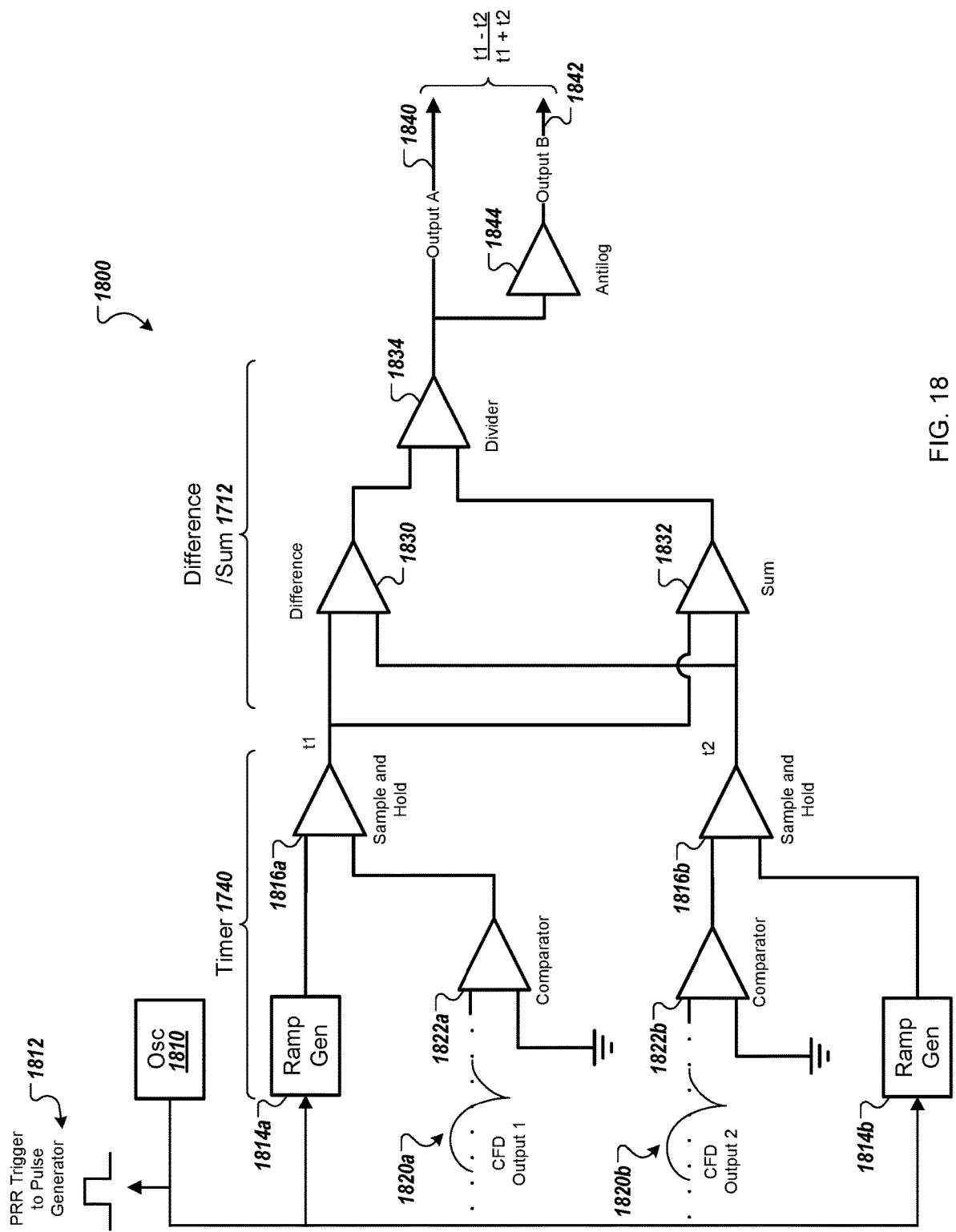
FIG. 18 is a block diagram of time-of-flight and ratiometric function blocks.

FIG. 18 is a block diagram 1800 of time-of-flight and ratiometric function blocks. The circuit in the illustrated example provides a basis for a description of the example timer 1740 and TOF difference over sum blocks 1712 of FIG. 17.

A free running oscillator 1810 provides a time-based trigger to both a pulse generator 1812 and a reset signal to two ramp generators 1814a, 1814b. A linear voltage ramp is fed to sample and hold (S-H) function 1816a, 1816b to start a sampling timer running. When a CFD output signal 1820a from transducer 1 crosses zero, a comparator 1822a output activates the hold on the S-H 1816a stopping the timer and latching the echo return time t1 as a specific voltage level on its output. Similarly, the echo return time t2 voltage equivalent is processed and latched on the output of the S-H function 1816b based on a CFD output signal 1820b from transducer 2 and a comparator 1822b output.

These voltages (times) are continually updated with each successive pulse-echo cycle at the rate set by the PRR frequency. In so doing, the change in position of the target is recorded as a continuous sequence of $t_1$ and $t_2$ times.

The two voltages values, $t_1$ and $t_2$, are then simultaneously fed into a difference amplifier 1830 to get a differential time $t_1-t_2$, and a summing amplifier 1832 to get $t_1+t_2$. These difference and sum voltages are then input to an amplifier 1834 that performs a division and arrives at the difference over sum ratio-metric output, $(t_1-t_2)/(t_1+t_2)$.

Figure 19:
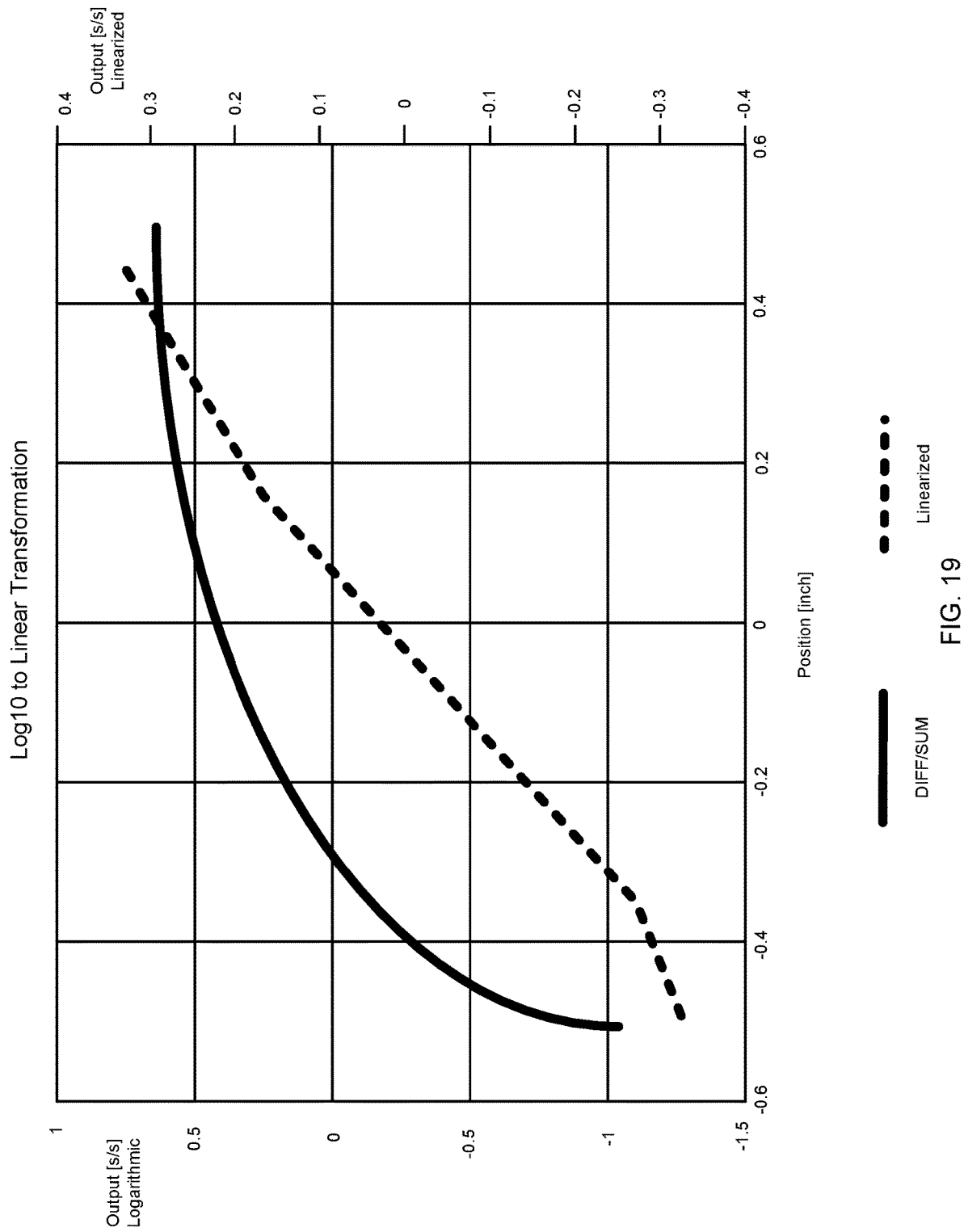
FIG. 19 is a graph of an example log 10 to linear transformation.

If two opposing transducers are used on either side of the moving target, an output 1840 will be a linear relationship of seconds/second vs position. If one of the two transducers is fixed, the resulting difference over sum relationship will be a logarithmic (log 10) profile instead of a linear one. To make subsequent use of this output easier to use, the logarithmic signal can be linearized by an antilog circuit 1844. An inverse exponential or anti-log can be realized by the equation $10x=e^{2.3x}$. An exponential amplifier can be accomplished with an analog circuit. By setting the logarithmic difference over sum voltage from the stationary target set-up=x, a three-step process can arrive at a linear ramp on output 1842 substantially equal in range to the natural linear ramp at output 1840 that occurs for an opposing transducer set-up. First multiply x by 2.3, then pass it through the exponential amplifier to realize the $e^{2.3x}$ operation. Finally, a linear scaling and offset function, y=mx+b, can fit the linear ramp to the desired range. FIG. 19 is a graph of an example log 10 to linear transformation. In some implementations, a notional circuit could be used to perform this function. The log 10 and resulting linear signals are shown in FIG. 19.

Figure 20:
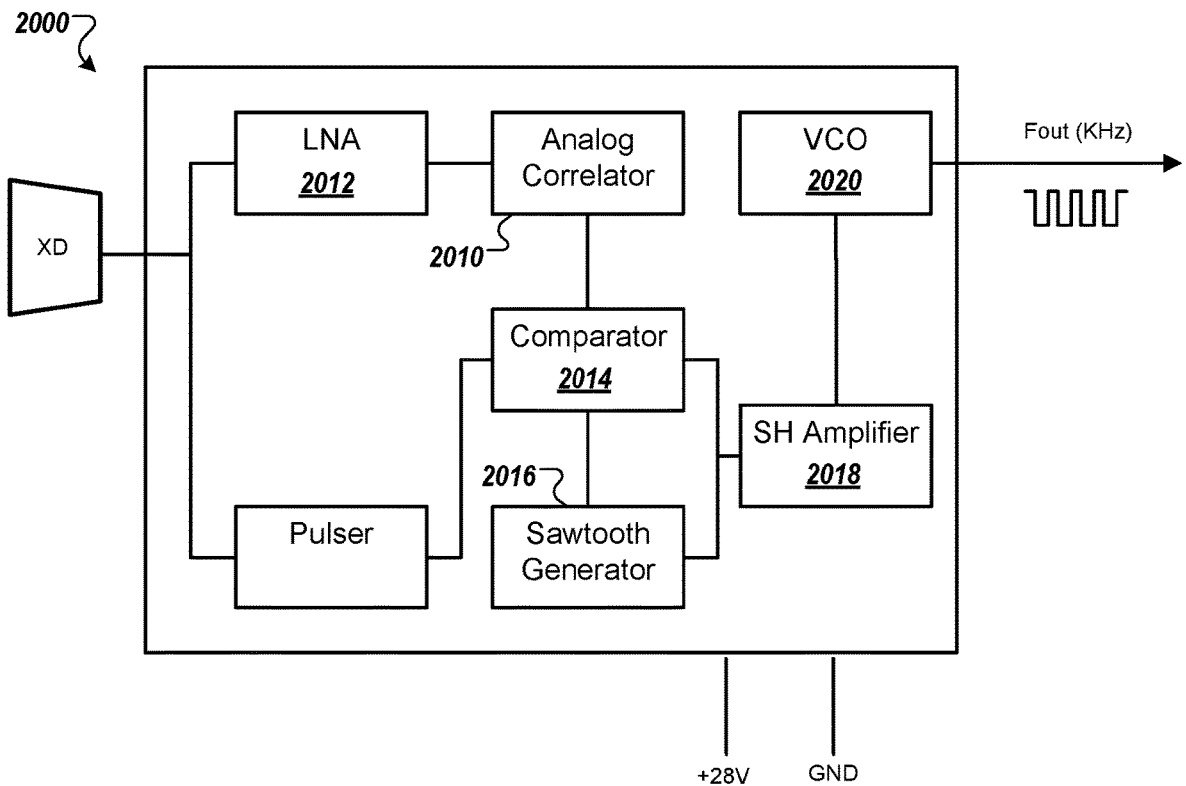
FIG. 20 is a block diagram of an example analog cross-correlation module.

In yet another embodiment, the ToF sensor can consist of a transmitter and correlation matched-filter receiver along with a voltage to frequency converter that produces a continuous frequency output proportional to the measured ToF. The transmitter can be a simple pulse generator that periodically charges and dumps an accumulated charge on the piezo transducer, exciting the crystal step response. A system functional block diagram of an example analog cross-correlation module 2000 is shown in FIG. 20.

In this illustrated embodiment, the previously described CFD and ramp timer can be replaced with a frequency domain correlator or matched filter in the receiver. A correlation time-of-flight receiver would consist of a correlator 2010, a low-noise amplifier (LNA) 2012, a comparator 2014, a ramp or sawtooth generator 2016, a zero-order sample hold 2018, and a voltage-controlled oscillator. A received signal is amplified by the LNA 2012 and correlated with a local template impulse during a pulse repetition period (PRP), and its output is sampled and held to detect whether there is a signal in the PRP observation window. The analog correlator 2010 includes a standard Gilbert cell (GC), load capacitor, and other supporting circuits. An example embodiment of such an analog correlator is presented as FIG. 21.

After a fixed post TX dead-band interval, the standard GC multiplies the received signal with the template, and the product is integrated by the load capacitor. To evaluate the performance and describe the operation of the correlator, a two-tone signal model is also described.

The correlator 2010 is used to detect the presence of signals with a known waveform in a noisy background. The output is nearly zero if only noise is present; otherwise, the energy of the received signal is integrated with the local template waveform over a fixed time interval to obtain a voltage output above a predefined threshold. The cross-correlation function can be described by the following equation:

$$C_c = \int_{t0}^{t0+T} \cos(\omega_1 t + \varphi_1) + \cos(\omega_2 t + \varphi_2) dt \quad \text{(Equation 30)}$$

Where LO(t) is the local template signal, RF(t) is the input F frequency signal of the correlator, and T is the integration period.

The correlation process can be divided into two steps. The first step involves multiplication of the received signal and the reference waveform (local template signal) using a GC. The second step involves integration of the output current via a capacitor.

Figure 21:
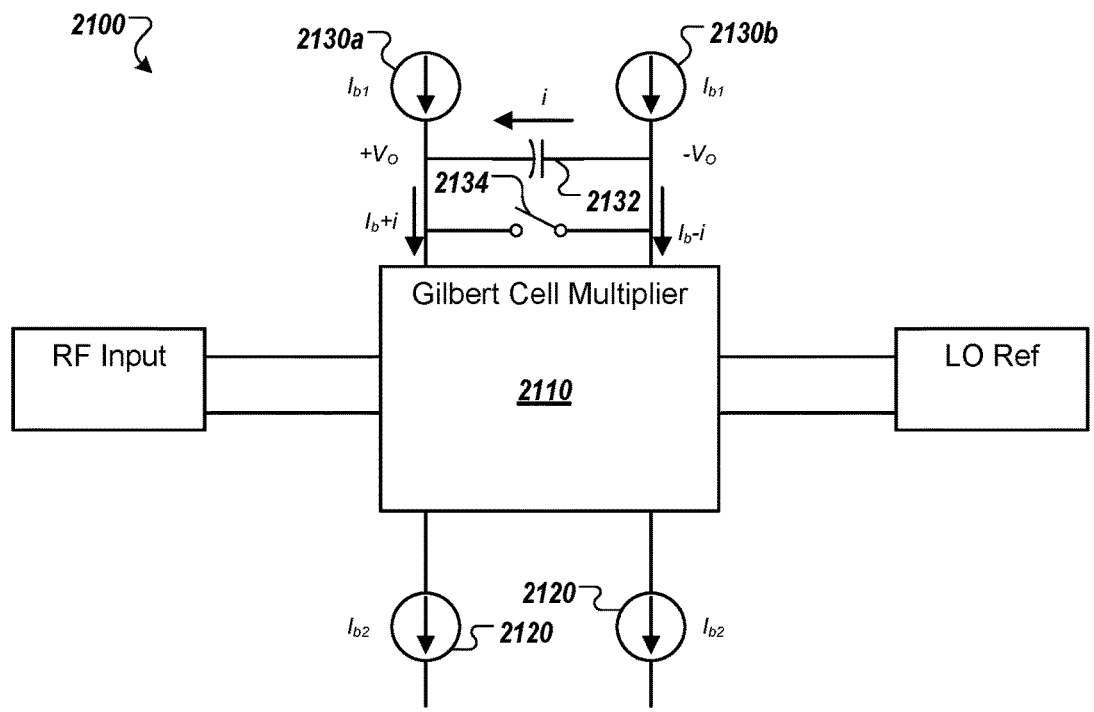
FIG. 21 is a block diagram of an example cross-correlation receiver module.

An example of a correlator 2100 is depicted in FIG. 21. A GC multiplier 2110, as a current-mode element, outputs a differential current 2120. The typical resistive or inductive load of a standard Gilbert mixer is replaced by two current sources 2130a, 2130b, and a capacitor 2132 across the differential output nodes. Because the common-mode part of the output current is absorbed by the current source load, the differential output current is directly fed into the load capacitor. As a result, the capacitor integrates the current and outputs a step-like voltage. A switch 2134 controlled by an internal clock is used to determine the integration interval and to clear the charge in the capacitor 2132 at the end of each interval.

Figure 22:
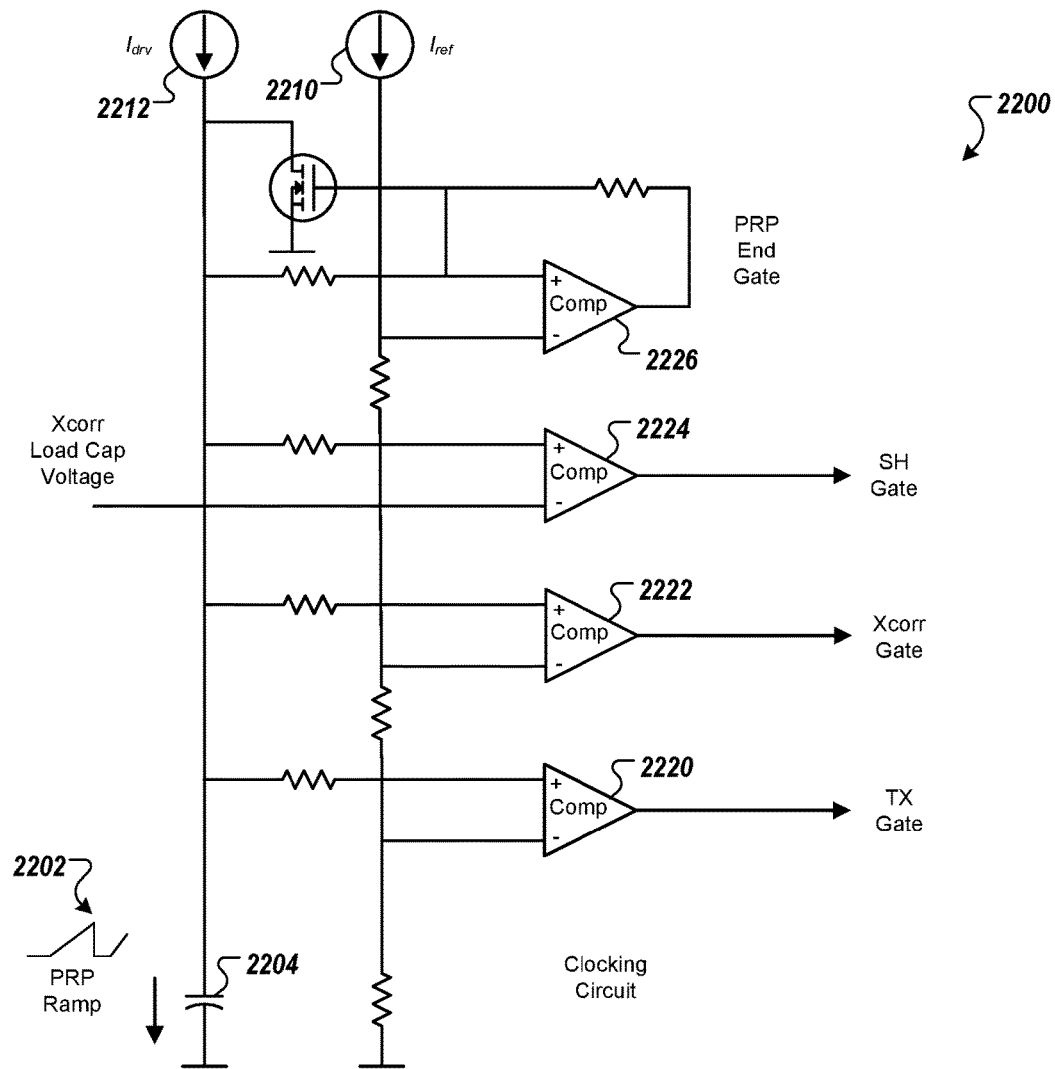
FIG. 22 is a schematic diagram of an example clock circuit.

Clocking is achieved using a ramp generator and comparators configured to trigger at voltage set points along the ramp waveform. An example of such a circuit 2200 is shown in FIG. 22. Relative timing between clock events is maintained ratio metrically using a fixed voltage divider having constant current source bias. A ramp 2202 is generated by charging a timing capacitor 2204 using a mirror 2212 of a divider current source 2210. In some implementations, use of mirroring can at least partly cancel relative drift between the voltage set points and the PRP ramp voltage, minimizing timing drift over circuit element and IC process variation.

The sequence of control gates is shown in FIG. 22. The PRP ramp 2202 is a free-running oscillator. A cycle begins when the timing capacitor 2204 is reset and the PRP ramp voltage is zero. As the capacitor 2204 charges, the ramp voltage increases, triggering a TX Gate comparator 2220 and firing the transducer driver circuit. A dead-band interval is built-in to the timing to disable the receiver during a short blanking interval. This dead-band prevents reverberations and other false signal returns from triggering the correlator prematurely. After the dead-band delay an Xcorr Gate comparator 2222 fires, allowing the integration switch on the GC to open and charge the load capacitor. The integrated load capacitor voltage represents the time cross-correlation of the template signal and the receiver signal.

The point in time of the measurement interval at which the correlator output voltage switches is determined by the ToF of the receiver input signal. Once the correlator switches the voltage on the load capacitor will begin to decay as soon as the receive echo passes, which will degrade accuracy. To prevent this, the PRP ramp and correlator output are compared by an SH Gate comparator 2224 to generate a SH Gate. The SH Gate activates a zero-order (sample) hold that captures the load capacitor voltage at the moment the correlator fires. The SH Gate can activate any time after the correlator is enabled by the Xcorr Gate, but not before, as the PRP ramp voltage ensures monotonic sequencing of the gates. When the end of the ToF interval is reached the final PRP End Gate is triggered by a PRP End Gate comparator 2226, resetting the timing capacitor 2204, and starting the cycle all over again.

Referring again to FIG. 20, the output of the sensor uses the voltage to frequency (VCO) converter 2020 to map the output of the sample-hold output voltage to a scaled frequency proportional to time. The VCO scaling can be adjusted to produce a suitable range as needed by a specific application.

VCO drift with temperature is a common problem that has a deleterious effect on accuracy in aerospace and other harsh-environment applications. Those familiar with the art will recognize that there are several approaches to managing temperature-induced VCO frequency and gain scaling drift, none of which fundamentally alter the operation principles of the system described here. One example method involves using combinations of components having complementary temperature coefficients in ways that cancel overall frequency drift, gain scaling, or both. Another example method employs a pair of VCOs that have close, but not identical gain scaling functions. As the frequencies drift apart with temperature, the measured gains and the two output frequencies can be combined as a system of two equations and two unknowns, allowing the drift to be compensated. Many other methods beyond those described are known in the art and will not be enumerated further here.

Due to the integration applied to the TOF through correlation, phase noise is typically not a significant error term of the correlation. Phase noise, when significant in this embodiment, is an artifact of the specific VCO implementation, not correlation. Presented above are methods to determine the position of a dynamic effector that either produce or can generate a ratio metric position through linear or logarithmic methods. In addition to the physical implementation, outlined are digital and analog solutions for determination of the ratio metric output of the device. This output signal can then be used for communication with a PID controller and command source. The ratio metric output signal can be used as a feedback variable for a PID controller and for reporting the position of an effector at the higher-level system command source.

Figure 23:
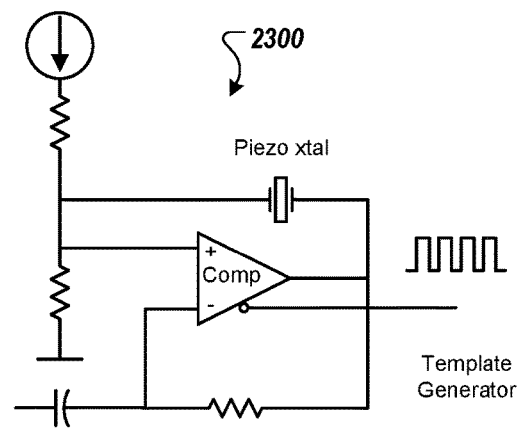
FIG. 23 is a schematic of an example template generator circuit.

FIG. 23 is a schematic of an example template generator circuit 2300. In some implementations, the template generator circuit 2300 can be used to produce a matching step response to a transducer by using matching piezo material as a resonant element.

Figure 24:
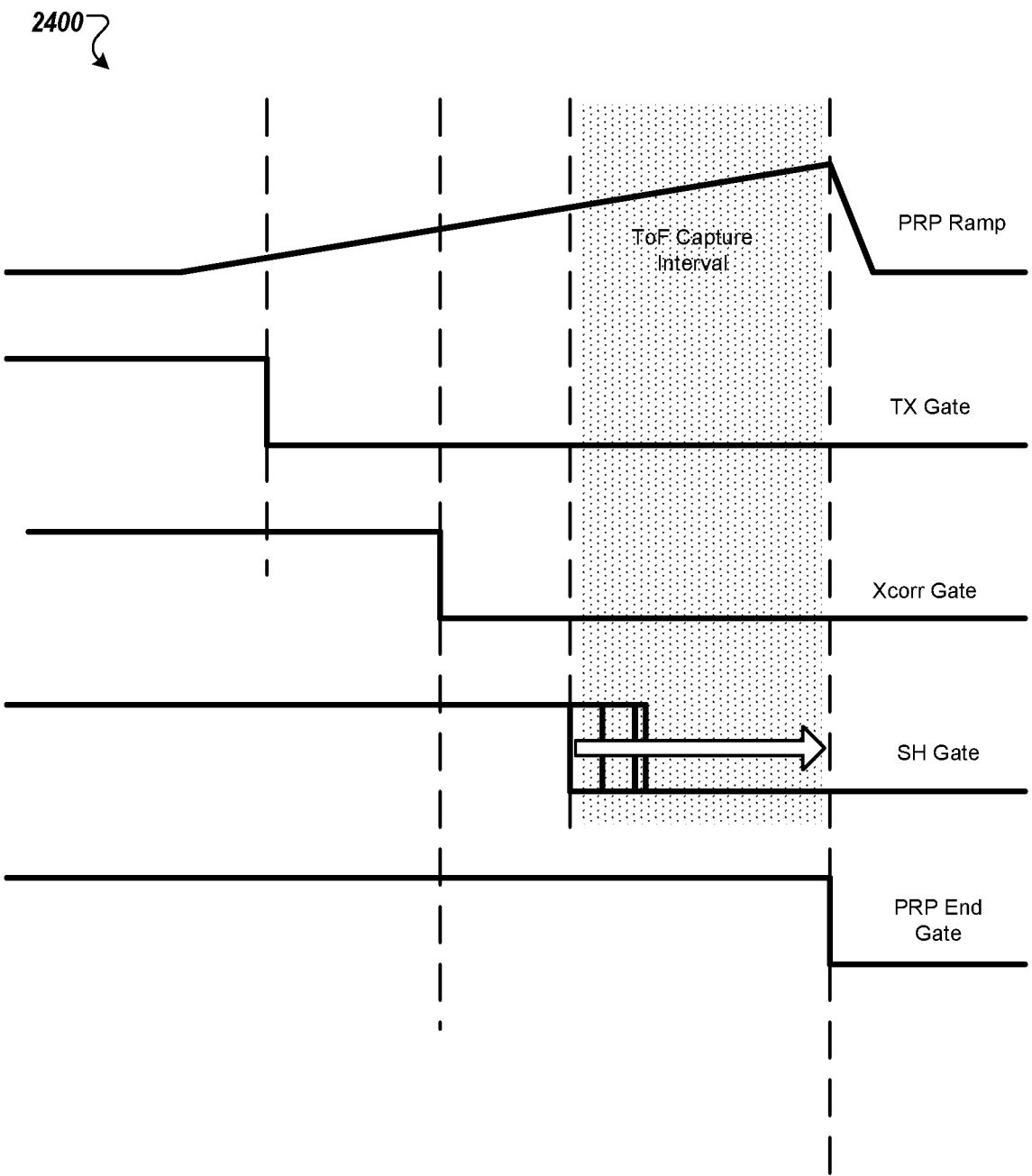
FIG. 24 is a graph of examples of signal timings.

FIG. 24 is a graph of examples of signal timings 2400 provided by the example circuit 2200 of FIG. 22. In general, PRP ramp-based timing can provide ratiometric delays from a single-timing capacitor and current source, while addition of hysteresis on PRP timing capacitor reset can reduce supply and temperature induced time jitter.

Figure 25:
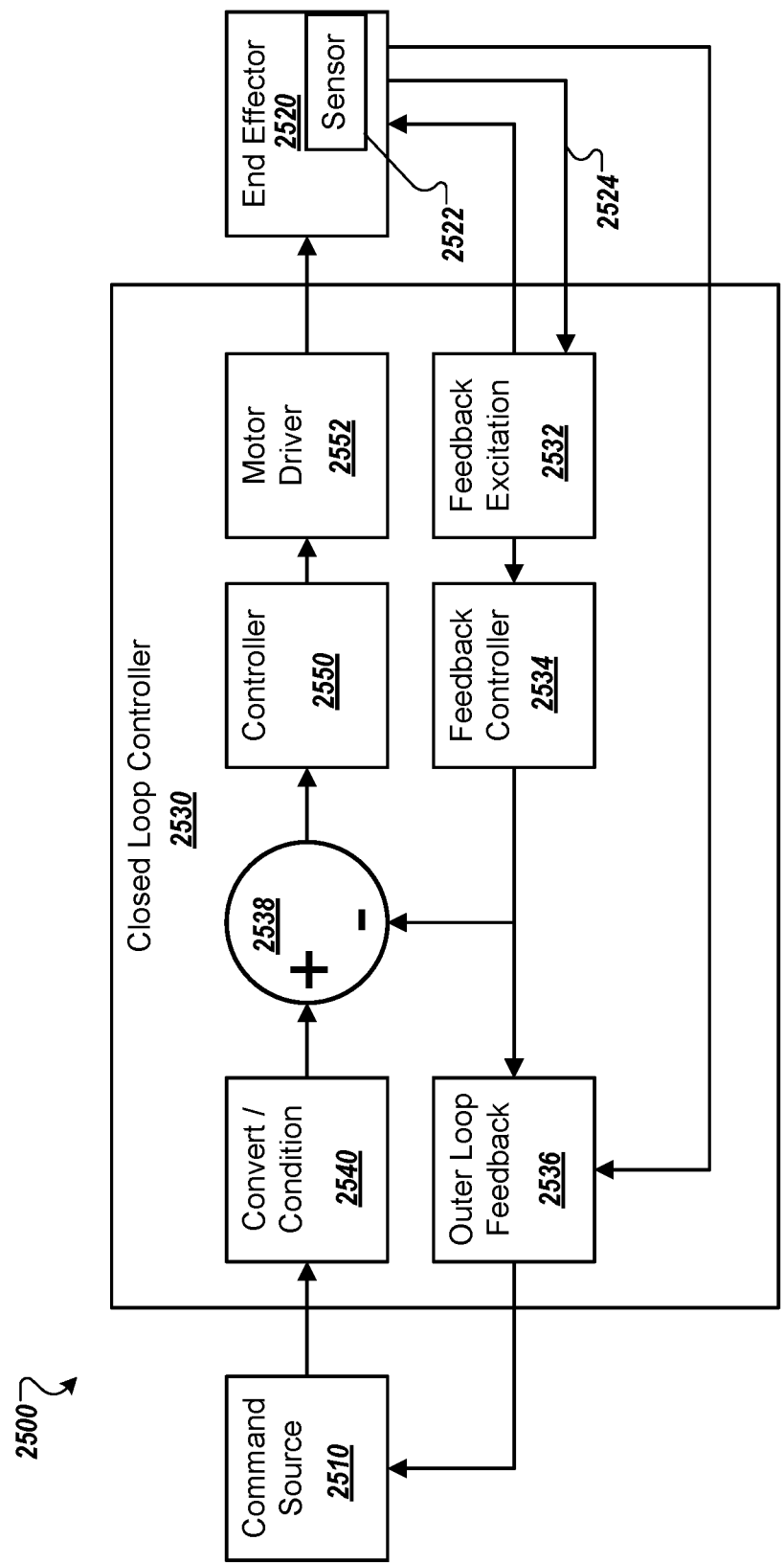
FIG. 25 is a block diagram of an example closed loop control system.

FIG. 25 is a block diagram of an example closed loop control system 2500. The system 2500 includes a command source 2510, an end effector 2520, and an electronic closed loop controller 2530. In some embodiments, the command source 2510 may be an engine controller. The command source 2510 provides a position request to the electronic controller 2530, and the electronic controller 2530 is configured to move the end effector 2520 via an actuation device.

The end effector 2520 includes a linear feedback sensor 2522. Examples of linear feedback sensors can include the ratio metric ultrasound position sensors presented herein, a linear variable differential transformer, a linear hall sensor, an optical sensor, or any other appropriate linear feedback sensor.

Example actuation devices may include but are not limited to direct drive valves, a pumping system, an electro-hydraulic servo valve, a solenoid, a solid-state actuator, a solid-state pump, or any appropriate actuation devices.

End effectors for position monitoring may include but are not limited to metering valves, regulating valves, equal area actuators, dual area actuators, and any other appropriate translation device.

The higher-level system controller 2530 is in communication with a PID controller (not shown). The PID controller is configured to activate an actuation device and cause the translation of the end effector 2520. In some implementations, the PID controller can be configured to adjust the command to the actuation device based on a comparison of the current position and the commanded position.

The electronic controller 2530 receives from the end effector 2520 a feedback signal 2524. The position of the end effector 2520 can then be determined by a feedback conditioner 2532 and a feedback controller 2534. In some implementations, the conditioner 2532 and the controller 2534 may be the digital or analog systems discussed in the descriptions of FIGS. 16-23.

The determined position is passed to an outer loop feedback module 2536 as a position status for health monitoring and outer loop feedback to the command source 2510. The determined position is also passed to a summing junction 2538 where the current position is compared to the commanded position defined by the command source 2510 and a signal conditioner 2540. The difference in the request position and current position is provided to a controller 2550, such as a PID controller, and actuates an actuator 2552, such as a brushless DC motor, to move the position of the end effector 2520. The PID controller (not shown) actively adjusts the actuator based on the current position compared to the commanded position.

Provided in FIG. 25 is an example configuration of a control system. The ratio metric position sensing solutions and respective circuitry of FIGS. 1-24 may be in any number of control systems. The ratio metric sensors and digital or analog controller can be applied to many system solutions, including others not specifically described in this document.

Figure 26:
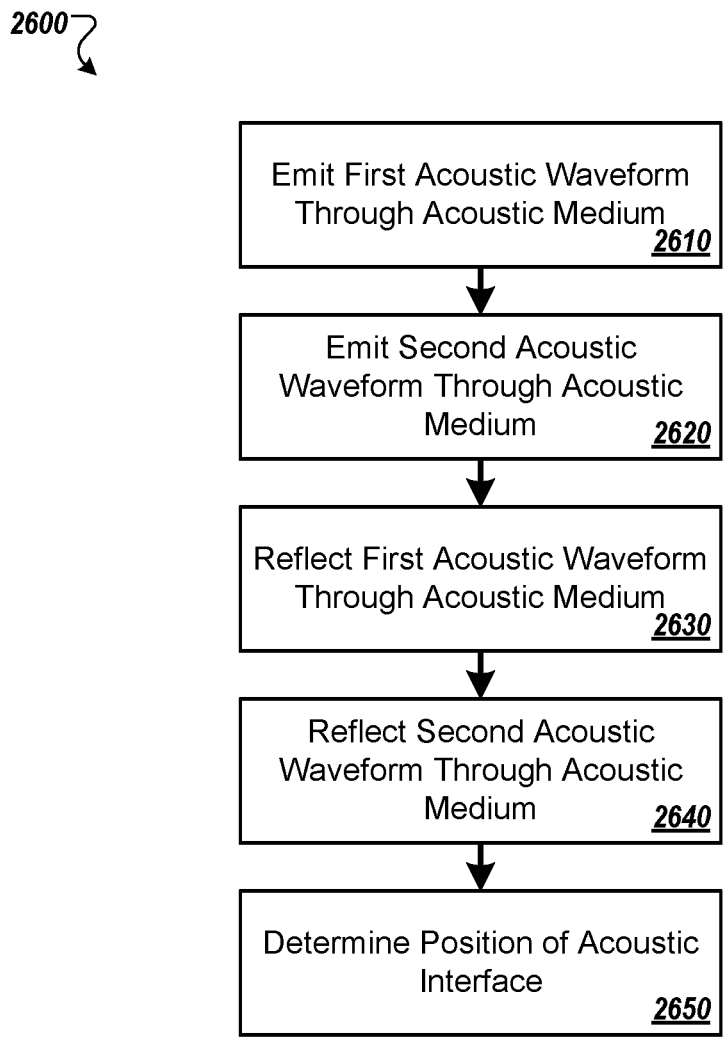
FIG. 26 is a flow diagram of another example process for ultrasonic position sensing.

FIG. 26 is a flow diagram of another example process 2600 for ultrasonic position sensing. In some implementations, the process 2600 may be performed by all or parts of the systems and circuits discussed in the descriptions of FIGS. 9-25.

At 2610 a first emitted acoustic waveform is emitted through a fluid having a first acoustic impedance toward a first acoustic interface. For example, the example acoustic transceiver 940a of FIG. 9 can emit the emitted acoustic waveform 942a toward the face 922.

At 2620, a second emitted acoustic waveform is emitted through the fluid toward a second acoustic interface. For example, the acoustic transceiver 940b can emit the emitted acoustic waveform 942b toward the face 932

At 2630, the first acoustic interface reflects a first reflected acoustic waveform based on the first emitted acoustic waveform. For example, the face 922 can reflect the emitted acoustic waveform 942a as the reflected acoustic waveform 944a.

At 2640, the second acoustic interface reflects a second reflected acoustic waveform based on the second emitted acoustic waveform. For example, the face 932 can reflect the emitted acoustic waveform 942b as the reflected acoustic waveform 944b.

At 2650, a first position of the second acoustic interface is determined based on the first reflected acoustic waveform and the second reflected acoustic waveform. For example, the example signal processor 960 can process signals from the acoustic transceiver 940a and the acoustic transceiver 940b to determine the position of the moveable body 938 within the cavity 930.

In some implementations, a first time of flight can be determined based on the first emitted acoustic waveform and the first reflected acoustic waveform, and determining a second time of flight based on the second emitted acoustic waveform and the second reflected acoustic waveform, wherein determining a first position of the acoustic interface is further based on the first time of flight and the second time of flight. For example, the signal processor 960 can be configured to perform processing based on the example equations 15-30 above.

In some implementations, the process 2600 can include determining the first position of the acoustic interface based on the first time of flight ($t_1$) and the second time of flight ($t_2$) can be given by an equation: $(t_1-t_2)/(t_1+t_2)$ (e.g., equation 15).

In some implementations, the process 2600 can also include determining a second position of the second acoustic interface, and determining a speed of the second acoustic interface based on the first position and the second position.

For example, two successive position measurements of the example moveable body 938 to determine a speed of the moveable body 938.

In some implementations, the process 2600 can include determining a reflected acoustic frequency based on one or both of the first reflected acoustic waveform and the second reflected acoustic waveform, and determining a speed of the second acoustic interface based on the determined reflected acoustic frequency and a predetermined emitted acoustic frequency of the second emitted acoustic waveform. For example, the signal processor 960 can include a phase detector (e.g., to determine phase and/or Doppler shifts in reflected signals).

In some implementations, the first acoustic interface can be defined by a face of a fluid cavity having a second acoustic impedance that is different than the first acoustic impedance, the second acoustic interface can be defined by a second face of a moveable body within a fluid effector and having a third acoustic impedance that is different than the first acoustic impedance, the first emitted acoustic waveform can be emitted toward the first face through the fluid, the second emitted acoustic waveform can be emitted toward the second through the fluid, the first reflected acoustic waveform can be based on a first reflection of the first emitted acoustic waveform by the first face, and the second reflected acoustic waveform can be based on a second reflection of the second emitted acoustic waveform by the second face. For example, the sensor housing and the moveable body 938 can be made of materials that have acoustic impedances that are different from the acoustic impedance of the fluid in the cavities 920 and 930. The mismatches in acoustic impedances can cause reflections of the emitted acoustic signals 942a and 942b off the faces 922 and 932.

In some implementations, the process 2600 can include determining a phase difference between a second emitted phase of the second emitted acoustic waveform and a second reflected phase of the second reflected acoustic waveform, wherein determining a first position of the acoustic interface can be further based on the determined phase difference. For example, distance can be determined based on example equation 23.

In some implementations, the first emitted waveform can be emitted through a first fluid cavity toward a face of the first fluid cavity defining the first acoustic interface, and the second emitted waveform can be emitted through a second fluid cavity toward a second face of a moveable member defining the second acoustic interface. For example, the example emitted acoustic waveform 942a can be emitted through the cavity 920, and the example emitted acoustic waveform 942b can be emitted through the cavity 930.

In some implementations, the first emitted waveform can be emitted through a first portion of a fluid cavity toward a face of the fluid cavity defining the first acoustic interface, and the second emitted waveform can be emitted through a second portion of the fluid cavity toward a second face of a moveable member defining the second acoustic interface. For example, the example emitted acoustic signal 1150 of FIG. 11 can be emitted toward the face portion 1130 and the face portion 1112.

In some implementations, the process 2600 can include emitting a third emitted acoustic waveform through the fluid toward a third acoustic interface, reflecting, by the third acoustic interface, a third reflected acoustic waveform based on the third emitted acoustic waveform, and determining a second position of the third acoustic interface based on the first reflected acoustic waveform and the third reflected acoustic waveform. For example, in the example system 1500, a first acoustic signal can be emitted by one of the acoustic transceivers 1506 toward the face 1507, a second acoustic signal can be emitted by one of the acoustic transceivers 1518 toward a corresponding face 1517, and a third acoustic signal can be emitted by another one of the acoustic transceivers 1518 toward another corresponding one of the faces 1517.

Figure 27:
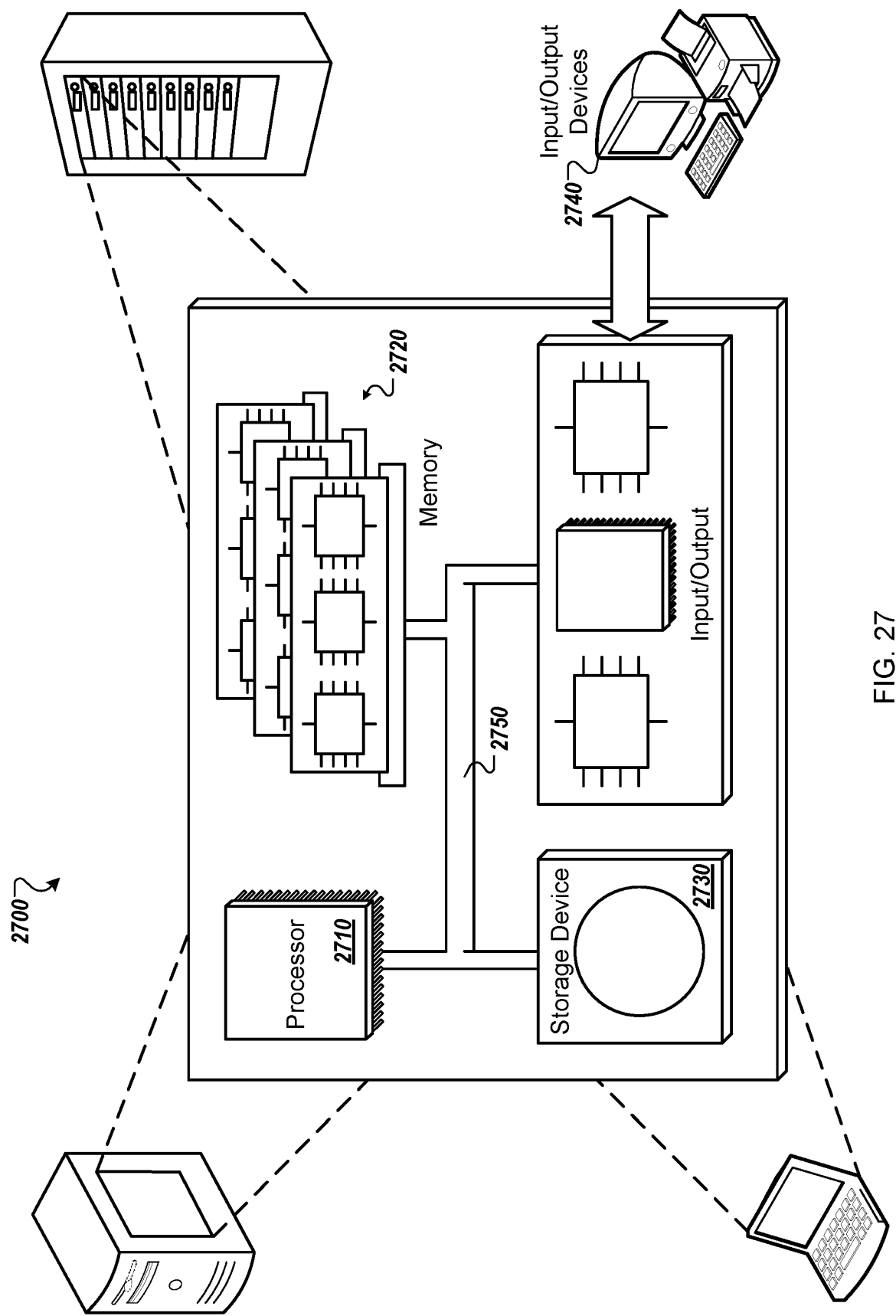
FIG. 27 is a schematic diagram of an example of a generic computer system.

FIG. 27 is a schematic diagram of an example of a generic computer system 2700. The system 2700 can be a data processing apparatus (e.g., processor system) used for the operations described in association with the process 800 according to one implementation. For example, the system 2700 may be included in either or all of the signal processors 150, 960, 1060, 1560, or the controllers 160, 970, 1070, or 1570.

The system 2700 includes a processor 2710, a memory 2720, a storage device 2730, and an input/output device 2740. Each of the components 2710, 2720, 2730, and 2740 are interconnected using a system bus 2750. The processor 2710 is capable of processing instructions for execution within the system 2700. In one implementation, the processor 2710 is a single-threaded processor. In another implementation, the processor 2710 is a multi-threaded processor. The processor 2710 is capable of processing instructions stored in the memory 2720 or on the storage device 2730 to display graphical information for a user interface on the input/output device 2740.

The memory 2720 stores information within the system 2700. In one implementation, the memory 2720 is a computer-readable medium. In one implementation, the memory 2720 is a volatile memory unit. In another implementation, the memory 2720 is a non-volatile memory unit.

The storage device 2730 is capable of providing mass storage for the system 2700. In one implementation, the storage device 2730 is a computer-readable medium. In various different implementations, the storage device 2730 may be a floppy disk device, a hard disk device, an optical disk device, or a tape device.

The input/output device 2740 provides input/output operations for the system 2700. In one implementation, the input/output device 2740 includes a keyboard and/or pointing device. In another implementation, the input/output device 2740 includes a display unit for displaying graphical user interfaces. In another implementation, input/output device 2740 includes a serial link, (e.g., Ethernet, CAN, RS232, RS485, optical fiber), for example, to interface to a remote host and/or to send measurement results, either in a command/response protocol, or at some periodic update rate after a short initialization period (e.g., <1 sec). In another implementation the input/output device 2740 includes a data bus connection to a second computer system or processor.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A position sensor system, comprising:
a sensor housing defining a first cavity having a first face;
a fluid effector comprising:
an actuator housing having an inner surface defining a second cavity; and
a moveable body having a second face and configured for reciprocal movement within the second cavity;
an acoustic transmitter system configured to emit a first emitted acoustic waveform toward the first face across a predetermined, fixed distance between the acoustic transmitter system and the first face, and emit a second emitted acoustic waveform toward the second face across a variable second distance between the acoustic transmitter system and the second face; and
an acoustic receiver system configured to detect a first reflected acoustic waveform based on a first reflection of the first emitted acoustic waveform based on the first face, and detect a second reflected acoustic waveform based on a second reflection of the second emitted acoustic waveform based on the second face.

2. The position sensor system of claim 1, further comprising a timer configured to determine a first time of flight of the first emitted acoustic waveform and the first reflected acoustic waveform, and determine a second time of flight of the second emitted acoustic waveform and the second reflected acoustic waveform.

3. The position sensor system of claim 2, further comprising a processor system configured to determine a position of the moveable body within the second cavity based on the first time of flight and the second time of flight.

4. The position sensor system of claim 1, wherein the acoustic transmitter system is configured to emit one or both of the first emitted acoustic waveform and the second emitted acoustic waveform through a fluid in one or both of the first cavity and the second cavity, and the acoustic receiver system is configured to receive one or both of the first reflected acoustic waveform and the second reflected acoustic waveform from the fluid in one or both of the first cavity and the second cavity.

5. The position sensor system of claim 1, wherein the acoustic transmitter system is configured to transmit the second emitted acoustic waveform at a predetermined emitted frequency, and the acoustic receiver system is configured to determine a reflected frequency of the second reflected acoustic waveform.

6. The position sensor system of claim 5, further comprising a processor system configured to determine a speed of the moveable body based on the predetermined emitted frequency and the reflected frequency.

7. The position sensor system of claim 1, wherein:
the fluid effector is a linear piston effector;
the first cavity is a first tubular cavity having a first longitudinal end and a second longitudinal end defining the first face opposite the first longitudinal end;
the second cavity is a second tubular cavity having a third longitudinal end and a fourth longitudinal end opposite the third longitudinal end;
the moveable body is a piston head configured for longitudinal movement within the second tubular cavity;
the acoustic transmitter system comprises a first acoustic transmitter arranged at the first longitudinal end and a second acoustic transmitter arranged at the third longitudinal end; and the acoustic receiver system comprises a first acoustic receiver arranged at the first longitudinal end and a second acoustic receiver arranged at the third longitudinal end.

8. The position sensor system of claim 1, further comprising a unified cavity comprising the first cavity and the second cavity.

9. The position sensor system of claim 8, wherein the first face is at least partly defined by a shoulder extending between first cavity and the second cavity.

10. The position sensor system of claim 1, wherein the acoustic transmitter system comprises:
a first acoustic emitter configured to emit the first emitted acoustic waveform toward the first face; and
a second acoustic emitter configured to emit the second emitted acoustic waveform toward the second face.

11. The position sensor system of claim 10, wherein the second acoustic emitter at least partly concentrically surrounds the first acoustic emitter.

12. The position sensor system of claim 1, further comprising a phase detector configured to determine a difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform.

13. The position sensor system of claim 1, further comprising another moveable body having a third face and configured for reciprocal movement within a third cavity, wherein the acoustic transmitter system is configured to emit a third emitted acoustic waveform toward the third face, and the acoustic receiver system is configured to detect a third reflected acoustic waveform based on a third reflection of the third emitted acoustic waveform based on the third face.

14. A method of position sensing comprising:
emitting, by an acoustic transmitter system, a first emitted acoustic waveform through a fluid having a first acoustic impedance toward a first acoustic interface across a predetermined, fixed distance between the acoustic transmitter system and the first acoustic interface;
emitting a second emitted acoustic waveform through the fluid toward a second acoustic interface across a variable second distance between the acoustic transmitter system and the second acoustic interface;
reflecting, by the first acoustic interface, a first reflected acoustic waveform based on the first emitted acoustic waveform;
reflecting, by the second acoustic interface, a second reflected acoustic waveform based on the second emitted acoustic waveform; and
determining a first position of the second acoustic interface based on the first reflected acoustic waveform and the second reflected acoustic waveform.

15. The method of claim 14, further comprising:
determining a first time of flight based on the first emitted acoustic waveform and the first reflected acoustic waveform; and
determining a second time of flight based on the second emitted acoustic waveform and the second reflected acoustic waveform;
wherein determining a first position of the second acoustic interface is further based on the first time of flight and the second time of flight.

16. The method of claim 15, wherein determining the first position of the second acoustic interface based on the first time of flight ($t_1$) and the second time of flight ($t_2$) is given by an equation: $(t_1-t_2)/(t_1+t_2)$.

17. The method of claim 14, further comprising:
determining a second position of the second acoustic interface; and
determining a speed of the second acoustic interface based on the first position and the second position.

18. The method of claim 14, further comprising:
determining a reflected acoustic frequency based on one or both of the first reflected acoustic waveform and the second reflected acoustic waveform; and
determining a speed of the second acoustic interface based on the determined reflected acoustic frequency and a predetermined emitted acoustic frequency of the second emitted acoustic waveform.

19. The method of claim 14, wherein:
the first acoustic interface is defined by a first face of a fluid cavity having a second acoustic impedance that is different than the first acoustic impedance;
the second acoustic interface is defined by a second face of a moveable body within a fluid effector and having a third acoustic impedance that is different than the first acoustic impedance;
the first emitted acoustic waveform is emitted toward the first face through the fluid;
the second emitted acoustic waveform is emitted toward the second face through the fluid;
the first reflected acoustic waveform is based on a first reflection of the first emitted acoustic waveform by the first face; and
the second reflected acoustic waveform is based on a second reflection of the second emitted acoustic waveform by the second face.

20. The method of claim 14, further comprising determining a phase difference between a second emitted phase of the second emitted acoustic waveform and a second reflected phase of the second reflected acoustic waveform, wherein determining a first position of the second acoustic interface is further based on the determined phase difference.

21. The method of claim 14, wherein the first emitted acoustic waveform is emitted through a first fluid cavity toward a face of the first fluid cavity defining the first acoustic interface, and the second emitted acoustic waveform is emitted through a second fluid cavity toward a second face of a moveable member defining the second acoustic interface.

22. The method of claim 14, wherein the first emitted acoustic waveform is emitted through a first portion of a fluid cavity toward a face of the fluid cavity defining the first acoustic interface, and the second emitted acoustic waveform is emitted through a second portion of the fluid cavity toward a second face of a moveable member defining the second acoustic interface.

23. The method of claim 14, further comprising:
emitting a third emitted acoustic waveform through the fluid toward a third acoustic interface;
reflecting, by the third acoustic interface, a third reflected acoustic waveform based on the third emitted acoustic waveform; and
determining a second position of the third acoustic interface based on the first reflected acoustic waveform and the third reflected acoustic waveform.

24. A non-transitory computer storage medium encoded with a computer program, the computer program comprising instructions that when executed by data processing apparatus cause the data processing apparatus to perform operations comprising:
emitting, by an acoustic transmitter system, a first emitted acoustic waveform through a fluid having a first acoustic impedance toward a first acoustic interface across a predetermined, fixed distance between the acoustic transmitter system and the first acoustic interface;

emitting a second emitted acoustic waveform through the fluid toward a second acoustic interface across a variable second distance between the acoustic transmitter system and the second acoustic interface;

reflecting, by the first acoustic interface, a first reflected acoustic waveform based on the first emitted acoustic waveform;

reflecting, by the second acoustic interface, a second reflected acoustic waveform based on the second emitted acoustic waveform; and determining a first position of the second acoustic interface based on the first reflected acoustic waveform and the second reflected acoustic waveform.

25. A method of position sensing comprising:

emitting, by an acoustic transmitter system, a first emitted acoustic waveform through a fluid having a first acoustic impedance toward a first acoustic interface across a predetermined, fixed distance between the acoustic transmitter system and the first acoustic interface;

emitting a second emitted acoustic waveform through the fluid toward a second acoustic interface across a variable second distance between the acoustic transmitter system and the second acoustic interface;

reflecting, by the first acoustic interface, a first reflected acoustic waveform based on the first emitted acoustic waveform;

reflecting, by the second acoustic interface, a second reflected acoustic waveform based on the second emitted acoustic waveform;

determining a phase difference between a second emitted phase of the second emitted acoustic waveform and a second reflected phase of the second reflected acoustic waveform, wherein determining a first position of the second acoustic interface is further based on the determined phase difference; and determining a first position of the second acoustic interface based on the first reflected acoustic waveform, the second reflected acoustic waveform, and the determined phase difference.

* * * * *